(12) United States Patent
Hirota et al.

(10) Patent No.: US 6,501,523 B2
(45) Date of Patent: Dec. 31, 2002

(54) LIQUID CRYSTAL DISPLAY ELEMENT AND A DISPLAY DEVICE HAVING A HOMEOTROPIC ALIGNMENT

(75) Inventors: Shoichi Hirota, Hitachi (JP); Katsuhide Aoto, Mobara (JP); Makoto Tsumura, Hitachi (JP); Iwao Takemoto, Mobara (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/938,618

(22) Filed: Aug. 27, 2001

(65) Prior Publication Data

US 2002/0122147 A1 Sep. 5, 2002

(30) Foreign Application Priority Data

Jan. 11, 2001 (JP) ........................................ 2001-003186

(51) Int. Cl.$^7$ ............................................. G02F 1/1335
(52) U.S. Cl. ........................................ 349/117; 349/102
(58) Field of Search ................................. 349/102, 117

(56) References Cited

U.S. PATENT DOCUMENTS

| 5,327,270 A | | 7/1994 | Miyatake |
| 5,472,635 A | * | 12/1995 | Iida et al. ................... 349/117 |
| 5,490,003 A | | 2/1996 | Van Spring |
| 5,576,854 A | | 11/1996 | Schmidt et al. |
| 5,737,048 A | * | 4/1998 | Abileah et al. ............. 349/121 |
| 5,973,760 A | * | 10/1999 | Dehmlow ................... 349/102 |
| 6,147,727 A | * | 11/2000 | Shigeno ....................... 349/99 |
| 6,340,999 B1 | * | 1/2002 | Masuda et al. ............... 349/63 |

FOREIGN PATENT DOCUMENTS

| JP | 61-13885 | 1/1986 |
| JP | 64-7021 | 1/1989 |
| JP | 2-250026 | 10/1990 |
| JP | 4-319910 | 11/1992 |
| JP | 10-90731 | 4/1998 |

OTHER PUBLICATIONS

Appl. Phys. Lett., vol. 20, No. 5, Mar. 1, 1972, pp. 199–201.
"A New Twisted Nematic ECB (TN–ECB) Mode for a Reflective Light Valve" by T. Sonehara, et al., Japan Display '89, pp. 192–195.
Appl. Phys. Lett., vol. 68, No. 11, Mar. 11, 1996, pp. 1455–1457.
"Normally White Reflective Twisted Nematic Mode for Silicon–Chip–Based Light Valves" by Shoichi Hirota, et al.,, Part of the IS&T/SPIE Conference on Liquid Crystal Materials, Devices and Applications VII—San Jose, California—Jan. 1999, pp. 86–94.
"A Silicon–Chip–Based Light Valve with Reflective Twisted Nematic Mode for High–Definition Projectors" by Shoichi Hirota, et al., IDW '99, pp. 985–988.

* cited by examiner

Primary Examiner—James Dudek
(74) Attorney, Agent, or Firm—Dickstein Shapiro Morin & Oshinsky LLP

(57) ABSTRACT

A liquid crystal display-element which has the high speed response and the high contrast and a display device employing the same are provided. In a display device employing a reflection type liquid crystal light valve, a retardation of a retardation plate which is provided between a polarizing element such as a polarizing beam splitter and the reflection type liquid crystal light valve is generally made ¼ of the wavelength of the incident light, and an optical axis (a slow axis or a fast axis) of the retardation plate and the polarizing direction of the incident polarized light are shifted from each other by slightly larger than 0 degree in order to arrange such optical elements.

8 Claims, 21 Drawing Sheets

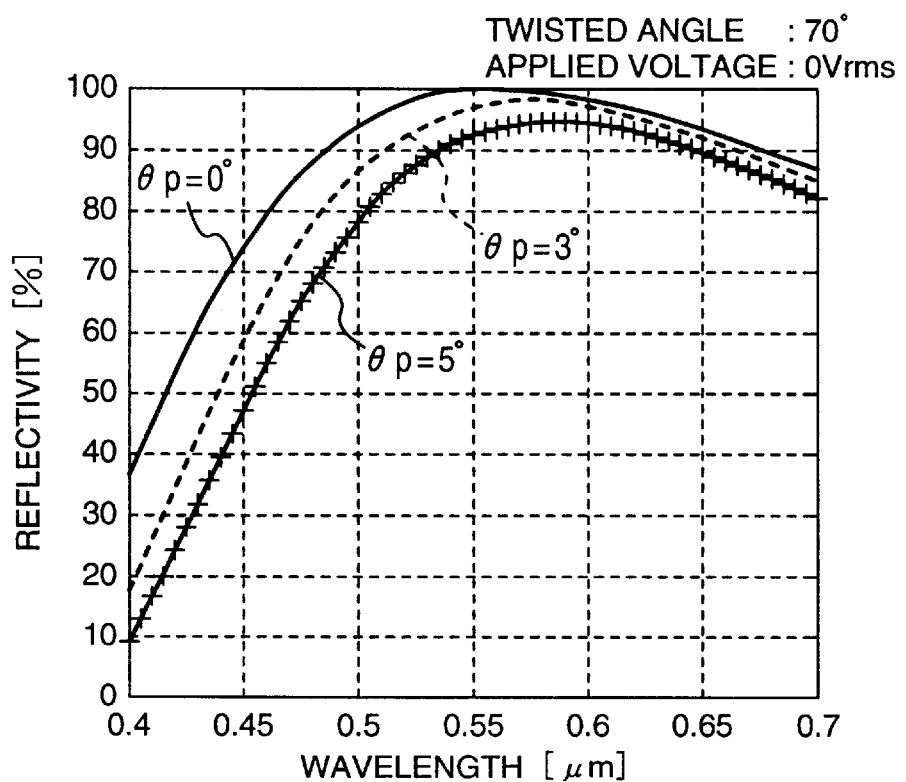
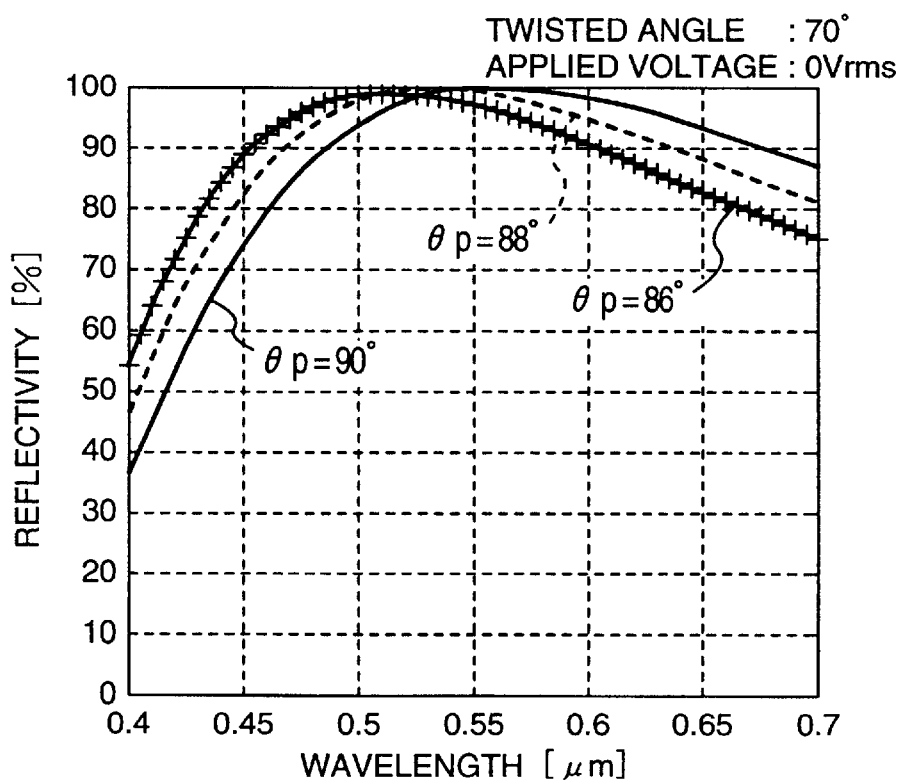

TWISTED ANGLE : 80°
APPLIED VOLTAGE : 4Vrms

TWISTED ANGLE : 80°
APPLIED VOLTAGE : 4Vrms $V_1 > V_2$

LIQUID CRYSTAL DISPLAY ELEMENT AND A DISPLAY DEVICE HAVING A HOMEOTROPIC ALIGNMENT

BACKGROUND OF THE INVENTION

1. Field of the Invention

The present invention relates to a liquid crystal display element and a liquid crystal display device employing the same, e.g., a liquid crystal projector.

2. Description of the Related Art

The liquid crystal display modes for the reflection type liquid crystal light valve employing a nematic liquid crystal are roughly classified into the three kinds of systems. That is, there are a tilted homeotropic ECB (Electrically Controlled Birefringence) mode, a homogenious ECB mode and a reflection type twisted nematic mode.

By the tilted homeotropic ECB mode is meant the alignment system in which the liquid crystal molecules are arranged in such a way as to be slightly inclined with respect to the perpendicular direction of each of a pair of substrates by utilizing the oblique evaporation method or the like, and this mode is described in an article of Applied Physics Letters 20, 199 (1972) for example.

By the homogenious ECB mode is meant the alignment system in which the liquid crystal molecules are arranged in such a way as to be roughly parallel to each of a pair of substrates, and this mode is described in JP-A-1-7021.

Also, by the reflection type twisted nematic mode is meant the system in which the liquid crystal molecules are arranged in such a way as to be roughly parallel to each of a pair of substrates and also the alignment directions in the vicinity of the pair of substrates holding therebetween the liquid crystal molecules shows the twisted positional relationship. By the way, for the twisted nematic mode, the several systems have been further proposed. As an example, there are an HFE (Hybrid Field Effect) mode, a TN-ECB (Twisted Nematic-Electrically Controlled Birefringence) mode, an SCTN (Self-Compensated Twisted Nematic) mode, an MTN (Mixed mode Twisted Nematic) mode, and the like.

The TN-ECB mode is described in an article of Japan Display '89, p. 192 (1989), the SCTN mode is described in JP-A-10-090731, and the MTN mode is described in an article of Applied Physics Letters 68, p. 1455 (1996). In addition, the inclusive analysis of the overall reflection type twisted nematic mode is described in an article of Proceedings of SPIE 3635, p. 87 (1999) and an article of Proceedings of IDW '99, p. 985 (1999).

By the way, of these modes, the HFE mode is the so-called normally black type display mode which becomes the black (dark) display when the voltage applied thereto is 0 Vrms, while becomes the white (light) display when a suitable voltage is applied thereto. Each of other three modes is the so-called normally white display mode which becomes the white (light) display when the applied voltage is 0 Vrms, while becomes the black (dark) display when a suitable voltage is applied thereto.

The typical system as the optical system employing these reflection type liquid crystal light valves is the optical system employing the polarizing beam splitter and it is described in JP-A-61-13885. In addition, as for other example, the optical system in which the main optical axis is made oblique with respect to the vertical direction of the liquid crystal light valve is described in JP-A-4-319910.

By the way, as for the technique in which the reflection type liquid crystal light valve and the retardation plate are combined with each other, the technique in which the polarizing beam splitter, the ¼ wave plate and the reflection type liquid crystal light valve are combined with one another and these elements are arranged in such a way that the fast axis or the slow axis of the ¼ wave plate intersects perpendicularly the flat surface containing the incident light axis and the reflected light axis of the polarizing beam splitter is disclosed in JP-A-2-250026 and U.S. Pat. No. 5,327,270. In addition, the technique in which the retardation of the retardation plate combined with the polarizing beam splitter is made equal to or larger than 0.25 (i.e., ¼ wavelength) is disclosed in U.S. Pat. No. 5,576,854. Also, the description of the polarizing controller including the double refraction material layer is made in JP-A-1-7021.

SUMMARY OF THE INVENTION

The above-mentioned article of Proceedings of SPIE 3635 p. 87 (1999) reports that the conditions containing the MTN mode in the normally white reflection type twisted nematic mode is most excellent in the balance of the characteristics of the light utilization efficiency, the chromaticity characteristics, and the driving voltage (contrast ratio).

However, if the high speed response characteristics of the liquid crystal is regarded as important, the conditions containing the TN-ECB mode is more desirable. The importance of the high speed response characteristics of the liquid crystal molecules will hereinbelow be described by taking as an example the case where the liquid crystal display element is employed in the display device of the personal computer.

The image signals in the personal computer normally consist of the image signals corresponding to at least equal to or larger than 60 frames per second. That is, in the case where the image is displayed on the display device of the personal computer, in order that the display may surely follow the image signals, the liquid crystal needs to have the response time which is equal to or shorter than a time corresponding to one frame, i.e., equal to or shorter than ⅟60 seconds=16.6 milliseconds. If the response time of the liquid crystal is equal to or larger than a time corresponding to one frame, then the image which is different from that obtained on the basis of the image signals is displayed on the display device, and hence it is recognized on the residual image, which is expected not to essentially appear, at the back of the movement direction of the image. The phenomenon is particularly remarkable in the moving image, which reduces remarkably the quality of the image. Therefore, in order to realize the liquid crystal display device having the excellent image quality, it is necessary to select the display mode of the liquid crystal showing the high speed response.

Then, since it is in general known that the response time of the liquid crystal is in proportion to the square of the thickness of the liquid crystal, the high speed response can be expected as the thickness of the liquid crystal is thinner. In this respect, since the conditions containing the TN-ECB mode has the desired standardized retardation which is smaller than that in the conditions containing the MTN mode, even when the same liquid crystal material is employed, the thickness of the liquid crystal layer in the conditions containing the TN-ECB mode can be made narrower than that in the conditions containing the MTN mode. As a result, in the case of the conditions containing the TN-ECB mode, the shortening of the response time of the liquid crystal, i.e., the high speed operation of the liquid crystal response can be promoted as compared with the MTN mode.

Furthermore, the reflection type liquid crystal valve other than the transmission type liquid crystal light valves is employed, whereby the response time can be shortened. This will hereinbelow be described.

There is the retardation as the component contributing to the modulation of light in the light valve. The retardation is expressed by the product of the thickness d of the liquid crystal layer and the anisotropy Δn of refractive index of the liquid crystal.

While in the case of the transmission type liquid crystal light valve, the retardation is expressed by dΔn, in the case of the reflection type liquid crystal light valve, since the optical path is folded back by the reflection mirror, the incident light reciprocates through the liquid crystal layer. In other words, in the case of the reflection type liquid crystal light valve, the retardation contributing to the modulation of light becomes two times as large as that in the case of the transmission type liquid crystal light valve, i.e., becomes 2dΔn and hence though the liquid crystal layers have the same thickness, in the case of the reflection type liquid crystal light valve, the retardation which is two times as large as that in the case of the transmission type liquid crystal light valve can be obtained. That is, in the case of the reflection type liquid crystal light valve, even when the same liquid crystal material having the anisotropy of refractive index is employed, the thickness of the liquid crystal layer which is required to obtain the desired retardation can be made generally half that of the transmission type liquid crystal light valve. As a result, the greatly high speed response can be expected for the reflection type liquid crystal light valve.

Therefore, it is one of main objects of the present invention to provide a liquid crystal display device in which the high speed response is possible.

In addition, in the transmission type liquid crystal light valve, in order to prevent the generation of the flicker due to the slight overlap of the D.C. voltages, the driving is carried out in such a way that the applied voltages to the adjacent pixels are opposite in polarity to each other. Moreover, since the lateral electric field is generated in the region between the adjacent pixels in which the applied voltages thereto are opposite in polarity to each other, the alignment of the liquid crystal goes out of order in that region. This, for example, results in the reduction of the contrast ratio of the leakage of light.

For this reason, in the transmission type liquid crystal light valve, the light is shut off for the region in which the alignment of the liquid crystal goes out of order, thereby preventing the reduction of the contrast ratio. However, this measures leaves the problem that the aperture rate as the rate which the aperture occupies in one pixel is largely reduced.

On the other hand, since in the reflection type liquid crystal light valve, about all of the region of the pixels can be covered with the reflection pixel electrodes, the reflection type liquid crystal light valve has the great feature that it is possible to realize the aperture rate, which is close to 100% without limit. But, of course, it is necessary to avoid the disorder of the alignment of the liquid crystal due to the above-mentioned lateral electric field, which is generated in the region between the adjacent pixels, as much as possible. For this reason, in the reflection type liquid crystal light valve, the frame inverting drive in which the polarity of the applied voltages is inverted every frame is carried out so that the applied voltages to the adjacent pixels do not become opposite in polarity to each other. For all that, for example, the lateral electric field may generate in the boundary region between the adjacent pixels for the white image and the black image in some cases.

In order that the alignment of the liquid crystal may be prevented from going out of order due to the lateral electric field, it is necessary to adjust properly the so-called pretilt angle as the angle between each of a pair of substrates and the liquid crystal molecules.

In order that the alignment of the liquid crystal may be prevented from going out of order due to the lateral electric field generated in the region between the adjacent pixels in the homeotropic alignment, it is necessary to incline the angle of the liquid crystal molecules on the substrate interface by several degrees with respect to the direction perpendicular to each of the pair of substrates. However, if the liquid crystal molecules are inclined, then the retardation is generated. As a result, the contrast ratio is reduced. That is, the lateral electric field-resistance and the contrast ratio show the trade-off relationship. Therefore, it is necessary to obtain the most suitable relationship by taking these facts into consideration.

It is therefore another object of the present invention to provide a liquid crystal display device in which the high contrast ratio can be obtained.

In order to solve the above-mentioned problems associated with the prior art, according to one aspect of the present invention, there is provided a liquid crystal display element including: a reflection type liquid crystal light valve having a liquid crystal layer held between a transparent electrode and a reflection electrode, and a plurality of pixel circuits for driving the liquid crystal layer; and a retardation plate, wherein the retardation plate is arranged in such a way that an optical axis (a slow axis or a fast axis) of the retardation plate and the polarizing direction of the incident polarized light to the retardation plate are slightly shifted from each other.

In addition, there is provided the liquid crystal display element in which the retardation of the retardation plate therein is generally ¼ of the wavelength of the incident light to the retardation plate.

An example suitable for the liquid crystal layer in the liquid crystal display element of the present invention is the liquid crystal having the twisted nematic alignment. In this connection, the twisted angle is set to the range of about 50 to about 90 degrees, and also the angle of the retardation plate is set to the value which is larger than 0 degree, but is equal to or smaller than 10 degrees, whereby the high contrast ratio can be realized.

Or, in the above-mentioned construction, the twisted angle is set to the range of about 50 to about 90 degrees, and also the angle of the retardation plate is set to the value which is smaller than 90 degrees, but is equal to or larger than 80 degrees, whereby the high contrast ratio can be realized.

Another example suitable for the liquid crystal layer in the liquid crystal display element of the present invention is the liquid crystal having the hemotropic alignment. When a first alignment direction of the liquid crystal is 45 degrees, the angle of the retardation plate is set to the value which is smaller than 0 degree, but is equal to or larger than −10 degrees, whereby the contrast ratio can be realized.

Or, in the above-mentioned construction, the angle of the retardation plate is set to the value which is larger than 90 degrees, but is equal to or smaller than 100 degrees, whereby the high contrast can be realized.

In addition, in order to solve the above-mentioned problems associated with the prior art, according to the present invention, there is provided a liquid crystal display device including: a liquid crystal display element having a reflection type liquid crystal light valve having a liquid crystal layer held between a transparent electrode and a reflection electrode, and a plurality of pixel circuits for driving the liquid crystal layer, and a retardation plate; a polarizing optical element; and a light source, wherein the retardation plate is arranged between the liquid crystal light valve and the polarizing optical element; the retardation of the retardation plate is generally ¼ of a wavelength of incident light to the retardation plate; and wherein the absolute value of an angle between an optical axis of the retardation plate and a polarizing axis of the polarizing optical element is larger than at least 0 degree, but is equal to or smaller than 10 degrees.

Furthermore, there is provided the liquid crystal display device in which the liquid crystal element in the liquid crystal display device is any one of the above-mentioned liquid crystal elements.

Other objects, features and advantages of the present invention will become apparent from the following description of the embodiments of the invention taken in conjunction with the accompanying drawings.

BRIEF DESCRIPTION OF THE DRAWINGS

FIG. 9A and FIG. 9B are respectively graphical representations each showing the characteristic curve of the white display when the twisted angle is 70 degrees;

DETAILED DESCRIPTION OF THE EMBODIMENTS

The embodiments of the present invention will hereinafter be described in detail with reference to the accompanying drawings.

First Embodiment

Figure 1:
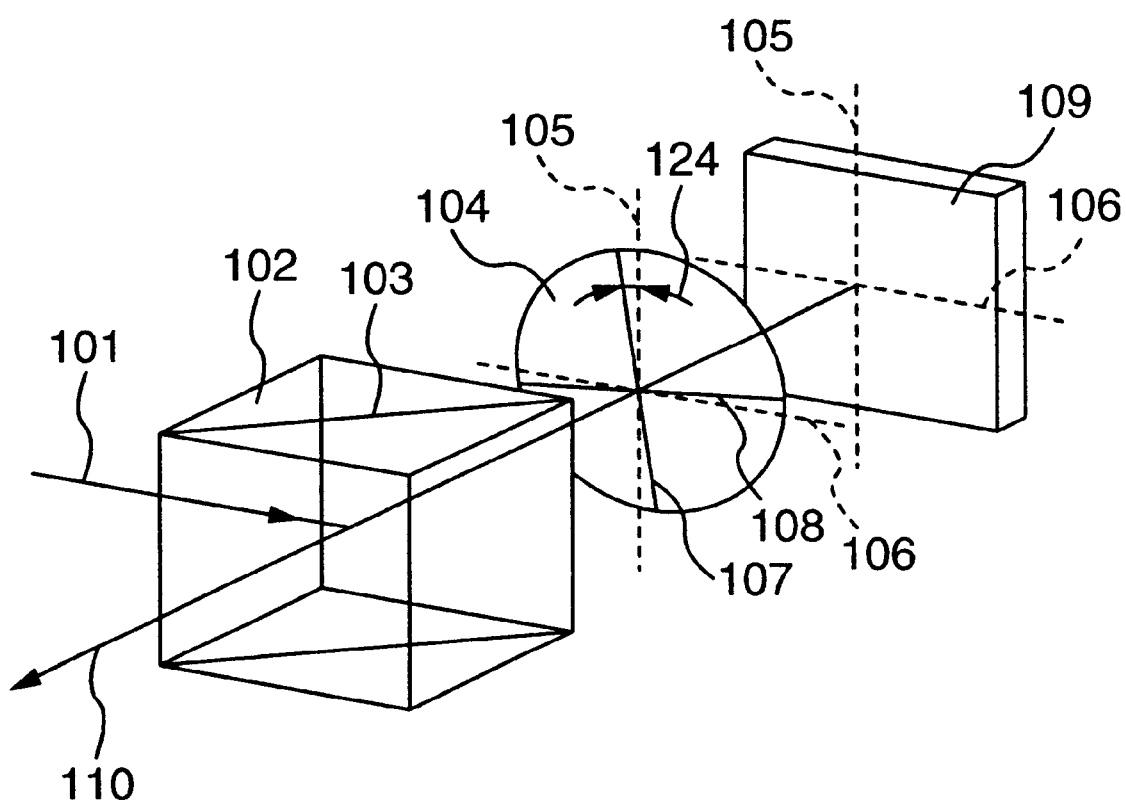
FIG. 1 is a diagram useful in explaining a liquid crystal display element of the present invention.

FIG. 1 is a diagram showing the relationship among the optical axes of optical elements in a liquid crystal display device of the present invention.

By the way, this liquid crystal display device can be applied to the products such as a liquid crystal projector and a liquid crystal television.

In FIG. 1, for the sake of simplicity of the description, there are shown only a reflection type liquid crystal light valve 109, a retardation plate 104, and a polarizing beam splitter 102.

By the way, the reflection type liquid crystal light valve 109 is connected to a liquid crystal driving driver (not shown) for driving this light valve 109, and the liquid crystal driving driver suitably drives a liquid crystal layer in accordance with the image information inputted thereto.

The polarizing beam splitter 102 is used as a polarizing element which serves as a polarizer as well as an analyzer, and is constructed by sticking two prisms to each other. Thus, the polarizing beam splitter 102 has the property of transmitting therethrough or reflecting therefrom the incident light in accordance with the polarized light component thereof in a sticking interface 103.

The retardation plate 104 is arranged between the liquid crystal light valve 109 and the polarizing beam splitter 102. As for the material of the retardation plate 104, for example, the material is suitable therefor which is obtained by extending a polycarbonate film to be adapted to show the double reflection characteristics. As for other materials, a polyvinyl alcohol film, a polystyrene film, a norbornene film and the like are also suitable therefor. In this connection, the materials taken herein are one example of the suitable materials, and hence the present invention is not intended to be limited to the above-mentioned materials. In addition, in the retardation plate 104, an axis which is parallel to the plane of polarization of the s-polarized light with respect to the sticking interface 103 of the polarizing beam splitter 102 is decided as an optical axis 105, and an axis which is parallel to the plane of polarization of the p-polarized light is decided as an optical axis 106. By the way, while the optical axes have the fast axis and the slow axis, for the sake of convenience, the fast axis is designated by reference numeral 108, and the slow axis is designated by reference numeral 107 herein. In addition, the fast axis and the slow axis may be substituted for each other, and this is also applied to other embodiments.

Next, the description will hereinbelow be given with respect to the operation of the arrangement of the optical elements. Light 101 which has been emitted from a light source (not shown) is made incident to the polarizing beam splitter 102. Of the incident light 101, the component of the s-polarized light with respect to a sticking interface 103 (hereinafter, referred to as "an interface 103" for short, when applicable) of the polarizing beam splitter 102 is reflected towards the retardation plate 104. Then, this s-polarized light thus reflected is transmitted through the retardation plate 104 to reach the liquid crystal light valve 109. Then, the s-polarized light is reflected by the liquid crystal light valve 109 to be transmitted through the retardation plate 104 again to be made incident to the polarizing beam splitter 102. By the way, in this case, the light of the s-polarized light component undergoes the phase modulation when being transmitted through the retardation plate 104 and the liquid crystal light valve 109. Therefore, in the light which is made incident to the polarizing beam splitter 102 again, the p-polarized light component with respect to the interface 103 is generated due to the phase modulation. This p-polarized light component is transmitted through the interface 103 to become an emitted light 110 to pass through a projecting lens system (not shown) to form an image on a screen (not shown). On the other hand, the s-polarized component with respect to the interface 103 is reflected towards the light source (not shown) by the interface 103 to be projected on the screen. By the way, by driving the liquid crystal light valve 109, it is possible to adjust the intensity ratio of the light returning back to the light source to the light going towards the screen. In other words, the state when the intensity of the light going towards the screen becomes maximum corresponds to the white (light) display state, while the state when the intensity of the light returning back to the light source lamp becomes maximum corresponds to the black (dark) display state.

Figure 2:
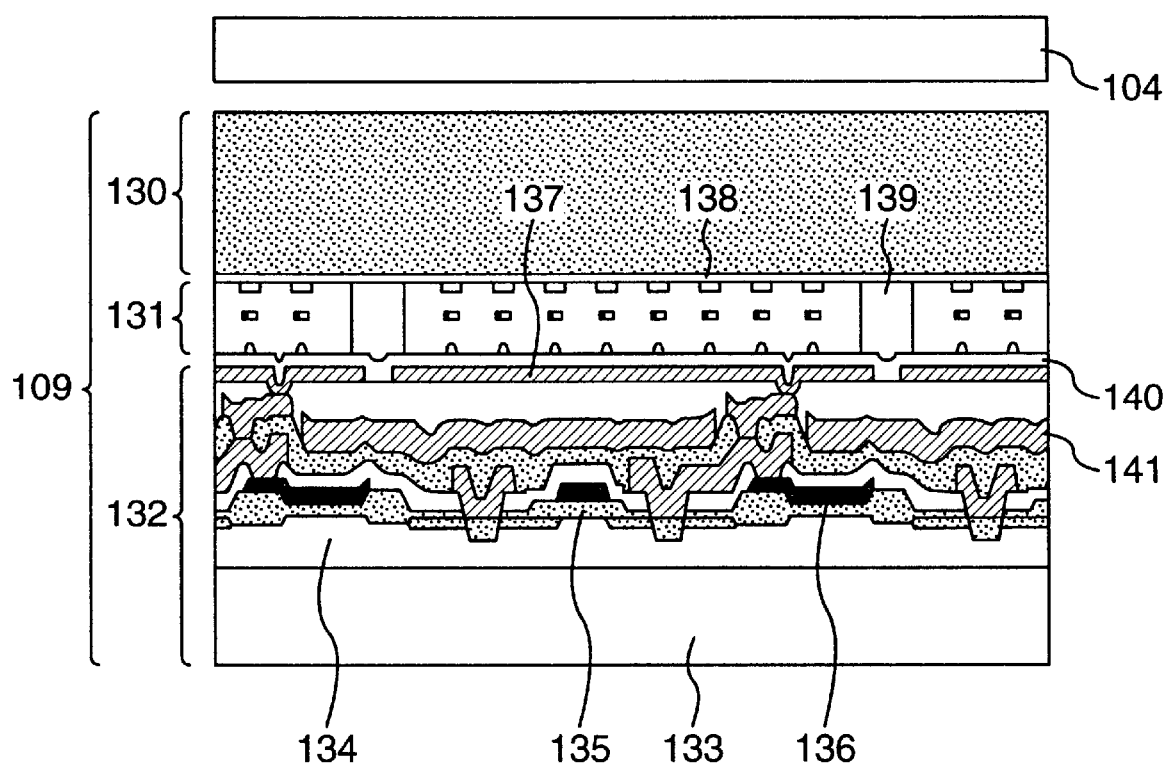
FIG. 2 is a cross sectional view of a liquid crystal display element of the present invention.

FIG. 2 is a cross sectional view of the liquid crystal display element of the present invention, and shows a cross section of the liquid crystal light valve 109 and the retardation plate 104.

The liquid crystal light valve 109 is constituted by a glass substrate 130, a liquid crystal layer 131, and an active matrix substrate 132.

In the first embodiment, a monocrystalline silicon substrate is employed as the active matrix substrate 132. The active matrix substrate 132 has, on an n type substrate 133, p type well regions 134, MOS (Metal Oxide Semiconductor) transistor 135, storage capacitors 136, wirings between the transistors, an insulating film, a reflection electrode 137, a protection film 140 therefor and the like. In addition, since the light valve for the projection is exposed to the high intensity light, in order to prevent the light from entering into any of the regions of the MOS transistors 135, the active matrix substrate 132 has also a shade layer 141.

The glass substrate 130 includes a transparent electrode 138, and a liquid crystal layer 131 and pole braces 139 are provided between the active matrix substrate 132 and the glass substrate 130. By the way, each of the pole braces is adapted to keep the thickness of the liquid crystal layer fixed.

The retardation plate 104 is arranged on the glass substrate 130 side of the liquid crystal light valve 109. While in the first embodiment, the retardation plate 104 is arranged apart from the liquid crystal light valve 109, alternatively, it may be stuck on the glass substrate 130. In addition, it is desirable that the retardation plate 104 may be covered with an antireflection coating for preventing the reduction of the light utilization efficiency and the reduction of the contrast ratio.

In this connection, the retardation of the retardation plate 104 has only to be generally about ¼ of the wavelength of the incident light to the retardation plate 104. By the phrase of "has only to be generally about ¼ of the wavelength of the incident light to the retardation plate 104" is meant that the retardation of the retardation plate 104 has only to fall in the range of 100 to 175 nm which is ¼ of 400 nm to 700 nm as the wavelength region of the visible light. This is also applied to other embodiments.

Second Embodiment

In a second embodiment, the twisted nematic alignment is applied to the liquid crystal layer.

First of all, the optical arrangement will hereinbelow be described with reference to FIG. 3.

Figure 3:
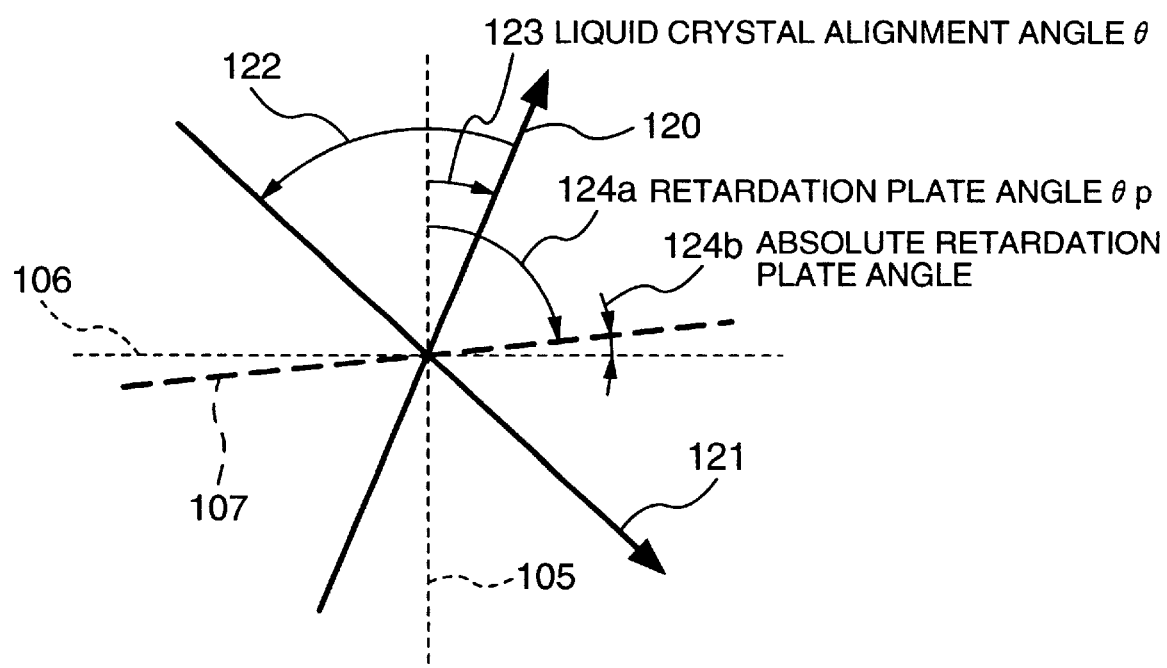
FIG. 3 is a diagram useful in explaining the relationship of the optical axes when the twisted nematic alignment is adopted as a liquid crystal layer.

FIG. 3 is a diagram showing the relative relationship among the optical axes when viewed from the vertical direction with respect to the liquid crystal panel. Then, the transparent substrate lies on this side, and the reflection substrate lies on the inside. Now, the alignment direction of the liquid crystal on the transparent substrate is defined as a first alignment direction 120 of the liquid crystal, the alignment direction of the liquid crystal on the reflection substrate is defined as a second alignment 121 of the liquid crystal, and the angle between the first and second liquid crystal alignment directions 120 and 121, i.e., the tortion angle of the liquid crystal is defined as a twisted angle 122. By the way, with respect to the sign of the twisted angle 122, the counterclockwise direction is positive, and the clockwise direction is negative. This is also applied to other drawings.

The angle between the first liquid crystal alignment direction 120 and the optical axis 105 or 106, i.e., the smaller angle is defined as a liquid crystal alignment angle (θ) 123. In FIG. 3, this angle corresponds to the angle between the first liquid crystal alignment direction 120 and the optical axis 105. By the way, with respect to the sign of the alignment angle 123, the clockwise direction is positive, and the counterclockwise direction is negative. This is also applied to other drawings.

Of the angles between the slow axis 107 or the fast axis 108 of the retardation plate 104 and the optical axis, of the optical axis 105 or 106, with which the liquid crystal alignment angle 123 is defined, the acute angle is defined as a retardation plate angle (θp) 124a. By the way, while in FIG. 3, this angle corresponds to the angle between the slow axis 107 and the optical axis 105, instead of the slow axis 107, the fast axis 108 may also be available.

In addition, the angle between the slow axis 107 or the fast axis 108 of the retardation plate 104, and the optical axis 105 or 106, i.e., the smallest angle is defined as an absolute retardation plate angle 124b. By the way, the absolute retardation plate angle 124b has only the positive sign.

The description will hereinbelow be given with respect to the concrete parameters of the liquid crystal layer 131 and the retardation plate 104. First of all, the description will now be given with respect to the parameters of the liquid crystal layer 131.

It is known that the twisted nematic liquid crystal layer is properly explained by the model in which the double refraction media of the n-layers are laminated while the optical axis is shifted by φ/n by φ/n. In particular, the propagation matrix when n=∞ is called the Jones matrix and is expressed by the following Expression.

$$J_\infty = \begin{pmatrix} a & b \\ -b^\phi & a^\phi \end{pmatrix} \quad (1)$$

The following Expressions (2) to (5) are established in connection with the above Expression (1).

$$a = \cos\phi\cos\beta + \frac{1}{\sqrt{1+\alpha^2}}\sin\phi\sin\beta - \frac{i\alpha}{\sqrt{1+\alpha^2}}\cos\phi\sin\beta \quad (2)$$

$$b = -\sin\phi\cos\beta + \frac{1}{\sqrt{1+\alpha^2}}\cos\phi\sin\beta - \frac{i\alpha}{\sqrt{1+\alpha^2}}\sin\phi\sin\beta \quad (3)$$

$$\alpha = \frac{d\Delta n}{\lambda}\frac{\pi}{\phi} \quad (4)$$

$$\beta = \phi\sqrt{1+\alpha^2} \quad (5)$$

where φ represents the twisted angle, d represents the cell gap, Δn represents the refractive index anisotropy, and λ represents the wavelength. Furthermore, since in the case of the reflection type liquid crystal light valve, the light undergoes the reflection and hence passes through the liquid crystal layer twice, the propagation matrix can be expressed as follows.

$$J_{R\infty} = R(\phi)J_\infty R(-\phi)R_e J_\infty \quad (6)$$

where R(φ) represents the rotational matrix, and Re represents the reversal matrix. If the reflectivity R when the polarizing arrangement is the crossed Nicols is calculated using the above Expression (6), then the following Expression is obtained.

$$R = \quad (7)$$
$$1 - \left(\cos^2\beta + \frac{1-\alpha^2}{1+\alpha^2}\sin^2\beta\right)^2 - 4\alpha^2\left(\frac{\sin^2\beta\sin 2\theta}{1+\alpha^2} + \frac{\sin\beta\cos\beta\cos 2\theta}{\sqrt{1+\alpha^2}}\right)^2$$

where θ represents the alignment angle of the liquid crystal. Then, in order to make the reflectivity R maximum (R=1), each of the square terms has only to be made zero in Expression (7).

Figure 4A:
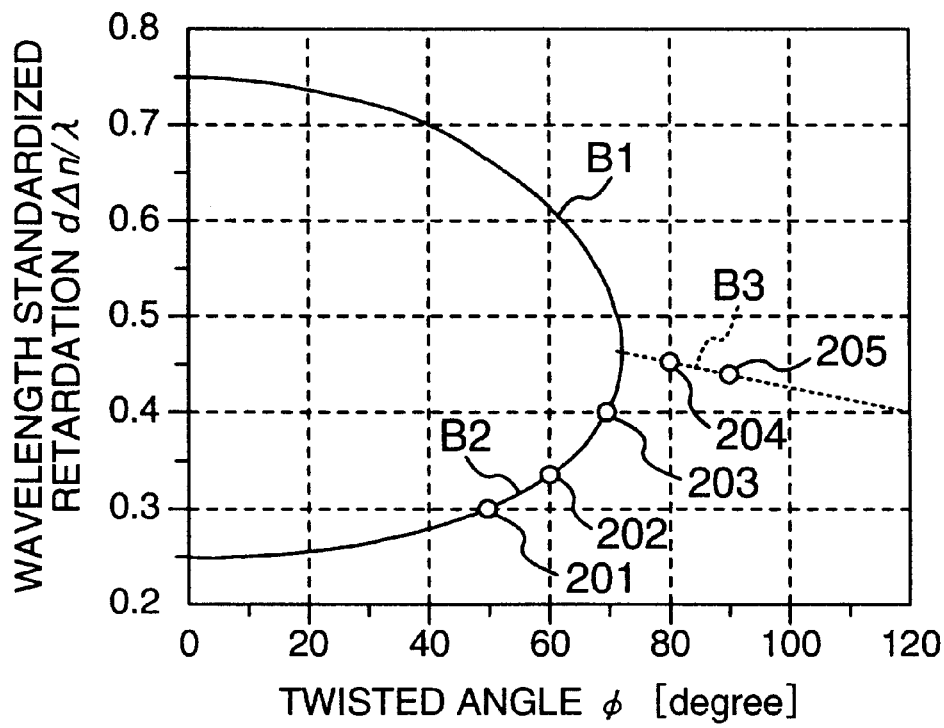
FIG. 4A and FIG. 4B are respectively graphical representations each useful in explaining the relationship among the twisted angle, the wavelength standardized retardation, and the alignment angle of the liquid crystal.

FIG. 4A is a graphical representation showing the relationship between the twisted angle φ and dΔn/λ when R=1 is established in Expression (7). A solid line in the figure is a curve showing the solution fulfilling R=1. As far as the solid line in FIG. 4A is viewed, it is understood that the presence of the condition in which R=1, i.e., the reflection efficiency becomes 100% is limited to the region in which the twisted angle is equal to or smaller than 73 degrees (the solid line is the curve in which φ=73 degrees is the maximum value). By the way, in the region in which the relationship of the twisted angle φ<73 degrees is established, the optimal condition of dΔn/λ for one twisted angle φ has two values, i.e., branches into two branches B1 and B2.

On the other hand, the optimal condition in which the reflection efficiency becomes maximum in the region of the twisted angle φ>73 degrees can be obtained by solving the following Expressions.

$$\partial R/\partial(d\Delta n/\lambda) = 0 \quad (8)$$

$$\partial^2 R/\partial(d\Delta n/\lambda)^2 > 0 \quad (9)$$

Figure 4B:
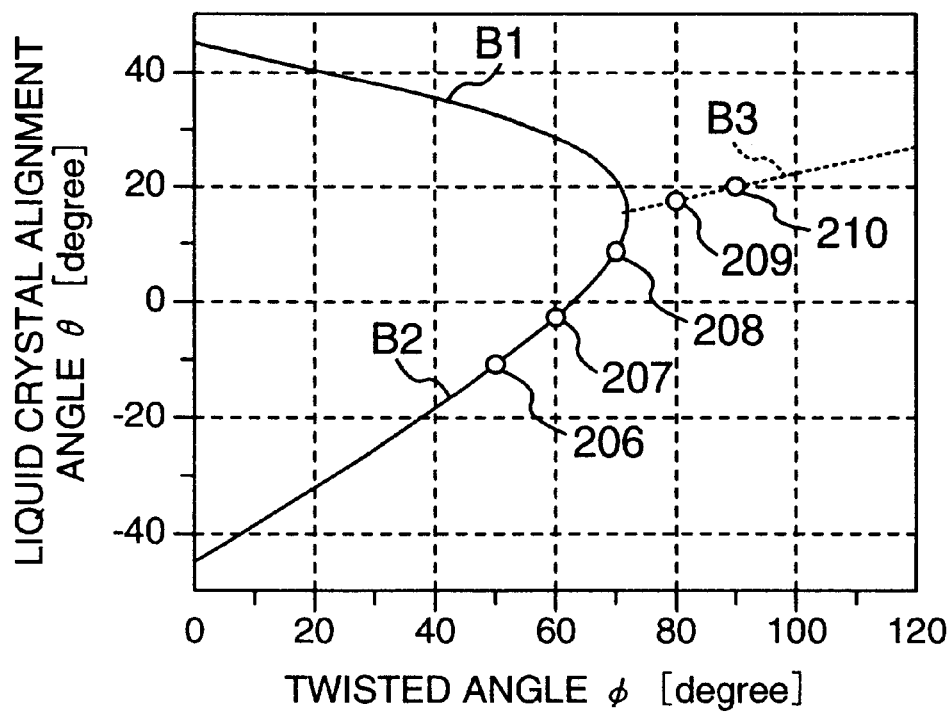

This solution is shown in the form of a dotted line (B3) in FIG. 4A. In addition, the dependency of the liquid crystal alignment angle θ introduced from the conditions shown in FIG. 4A on the twisted angle φ is shown in FIG. 4B. By the way, B1, B2 and B3 in FIG. 4B correspond to B1, B2 and B3 in FIG. 4A, respectively.

Figure 5A:
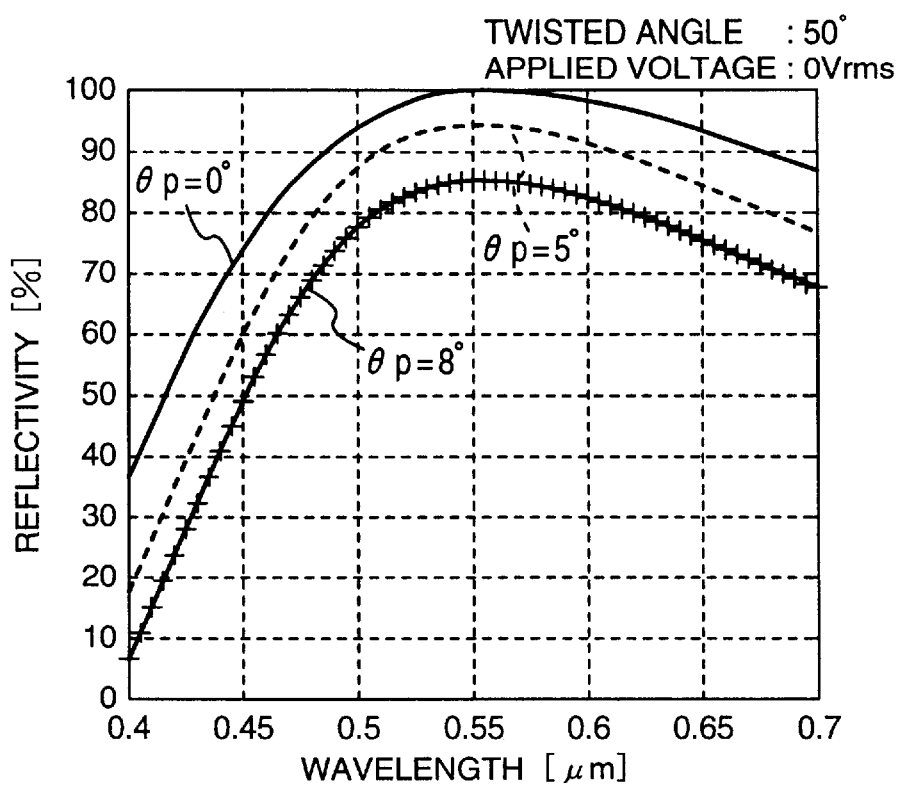
FIG. 5A and FIG. 5B are respectively graphical representations each showing the characteristic curve of the white display when the twisted angle is 50 degrees.
Figure 5B:
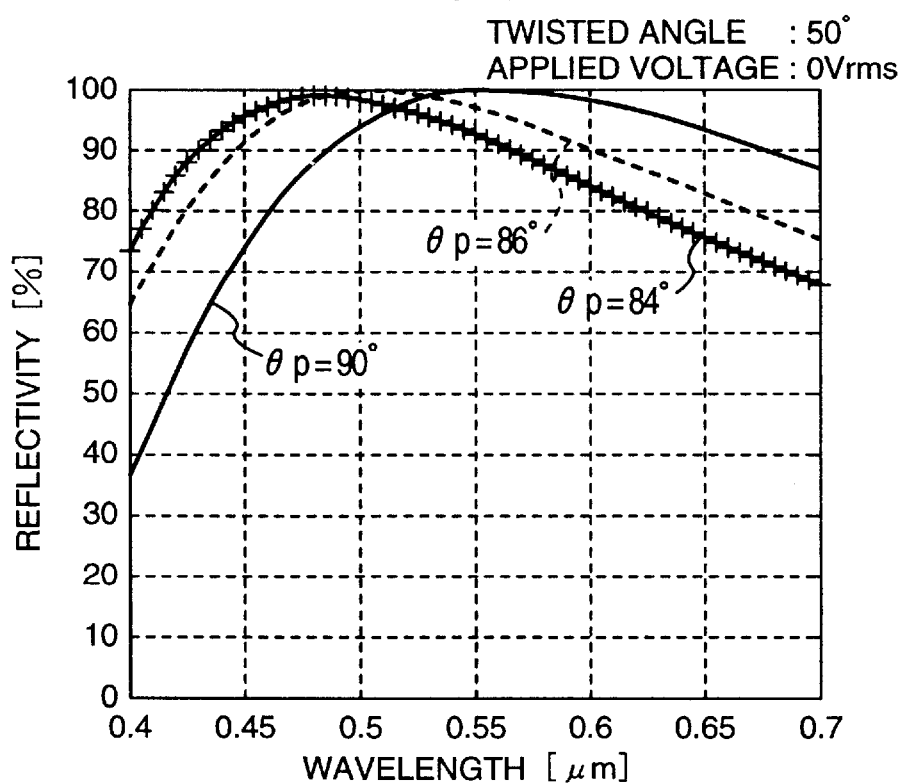

Next, the description will hereinbelow be given with respect to the relationship between the retardation plate angle 124a of the retardation plate 104 and the reflectivity of the liquid crystal light valve using the parameters when as the typical parameter conditions, the twisted angle is 50 degrees, 60 degrees, 70 degrees, 80 degrees and 90 degrees. By the way, the parameter conditions correspond to the conditions of circles 201 to 210 in FIG. 4A and FIG. 4B. In this connection, the reason that the twisted angle is made equal to or smaller than 90 degrees is that it is desirably that the reflectivity is 80% as the practical level, and also the fact that the twisted angle is made equal to or larger than 50 degrees is desirable in terms of that the reflectivity of the light in the visible region in the black (dark) display is suppressed equal to or smaller than 1% (the contrast ratio is about 100). First of all, the description will hereinbelow be given with respect to the case where the twisted angle is 50 degrees with reference to FIG. 5A and FIG. 5B. FIG. 5A and FIG. 5B are respectively graphical representations each showing the reflection spectrum in the white (light) display with respect to the various angles θp of the retardation plate 104 (the retardation plate angle 124a). By the way, the axis of ordinate represents the reflectivity and the axis of abscissa represents the wavelength. Also, the applied voltage is 0 Vrms.

In FIG. 5A, it is understood that the reflectivity is reduced as θp is increased with the reflectivity, when the retardation plate angle θp=0, as the reference. On the other hand, in FIG. 5B, it is understood that as θp is reduced, the maximum value of the reflectivity is generally fixed and also the peak is shifted to the shorter wavelength side.

Figure 6A:
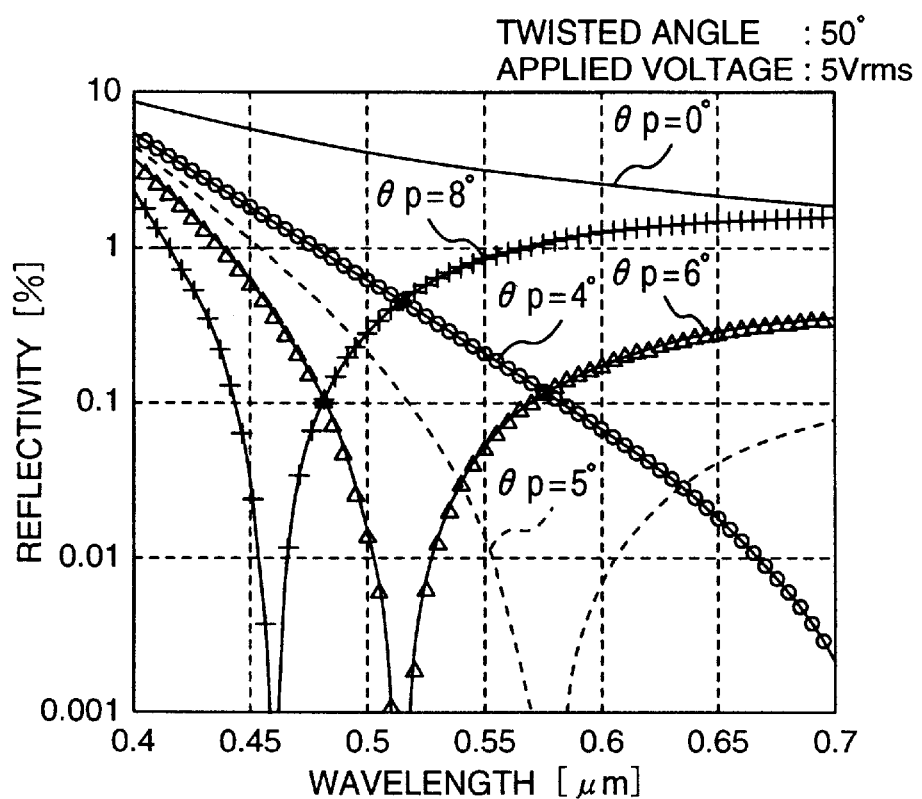
FIG. 6A and FIG. 6B are respectively graphical representations each showing the characteristic curve of the black display when the twisted angle is 50 degrees.
Figure 6B:
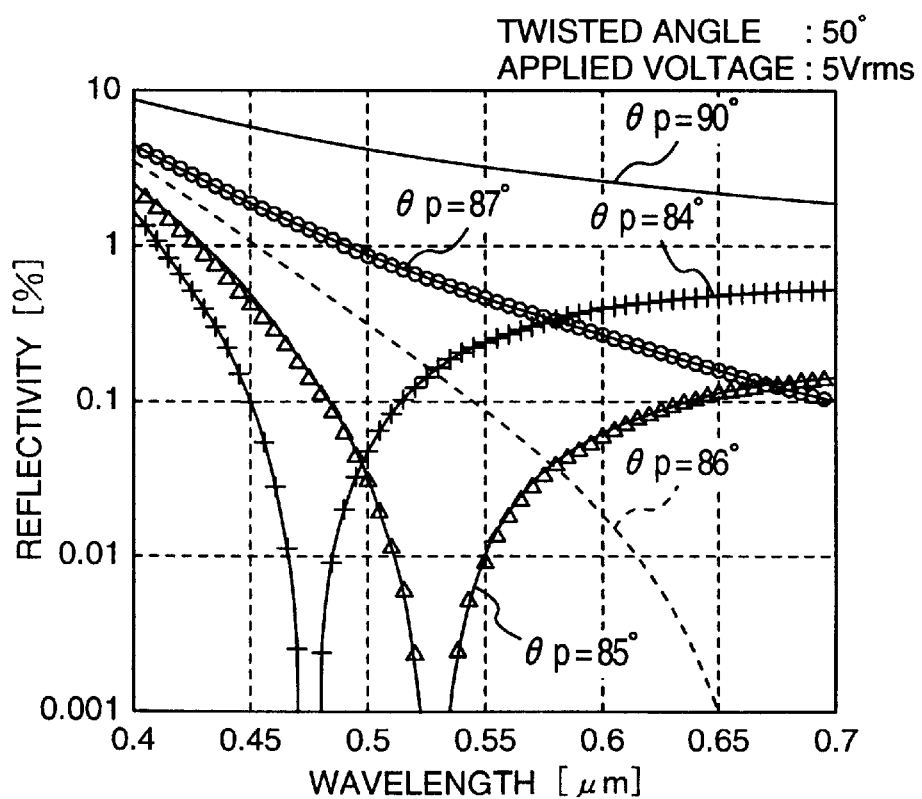

Next, the reflection spectra in the black (dark) display at this time are shown in FIG. 6A and FIG. 6B, respectively. Also, the applied voltage is 5 Vrms.

In FIG. 6A, it is understood that the reflectivity is reduced as θp is increased with the reflectivity, when the retardation plate angle θp=0 degree, as the reference. In particular, paying attention to the vicinity of the wavelength 0.55 μm which is the center of the visible region and which is largely connected with the contrast, it is understood that when θp is near the range of 5 to 6 degrees, the reflectivity becomes minimum, and when θp is further increased, conversely, the reflectivity is increased. Therefore, it may safely be said that the retardation plate angle 124a (θp) is larger than 0 degree, but is equal to or smaller than 10 degrees or so. In addition, as shown in FIG. 6B, it is understood that the reflectivity is reduced as θp is reduced with the reflectivity, when θp=90 degrees, as the reference. Similarly to the foregoing, paying attention to the vicinity of the wavelength 0.5 μm, it is understood that when θp is near the 85 degrees, the reflectivity becomes minimum, and when θp is further reduced, conversely, the reflectivity is increased. Therefore, it may safely be said that the retardation plate angle (θp) is smaller than 90 degrees, but is equal to or larger than 80 degrees or so.

Figure 7A:
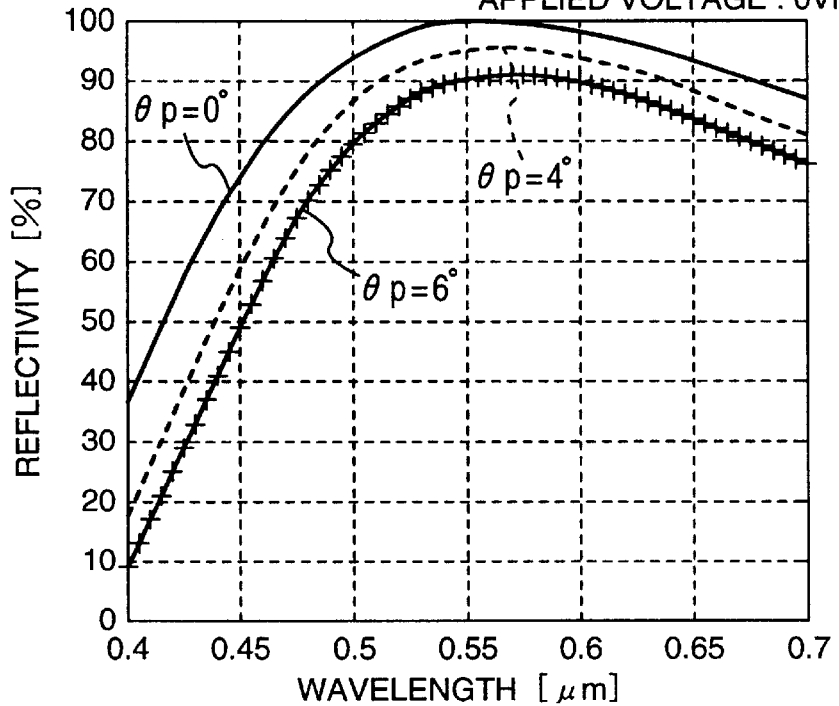
FIG. 7A and FIG. 7B are respectively graphical representations each showing the characteristic curve of the white display when the twisted angle is 60 degrees.
Figure 7B:
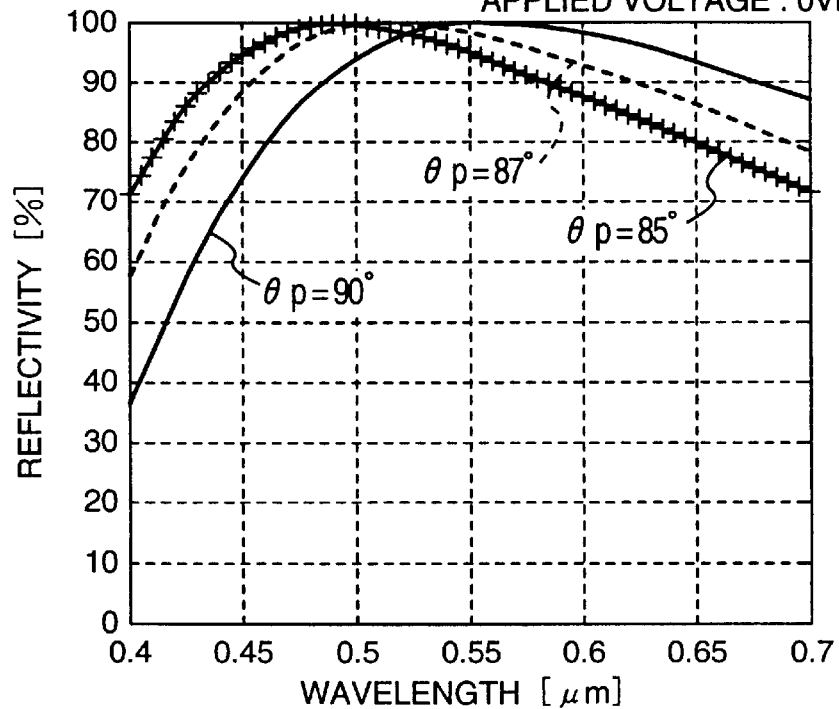

Next, the description will hereinbelow be given with respect to the case where the twisted angle is 60 degrees with reference to FIG. 7A and FIG. 7B. FIG. 7A and FIG. 7B are respectively graphical representations each showing the reflection spectrum in the white (light) display with respect to the various angles θp of the retardation plate angle 104 (the retardation plate angle 124a). By the way, the axis of ordinate represents the reflectivity, and the axis of abscissa represents the wavelength. Also, the applied voltage is 0 Vrms.

In FIG. 7A, it is understood that the reflectivity is reduced as θp is increased with the reflectivity, when the retardation plate angle θp=0 degree, as the reference. On the other hand, in FIG. 7B, it is understood that as θp is reduced with the reflectivity, when θp=90 degrees, as the reference, the maximum value of the reflectivity is generally fixed, and the peak is shifted to the shorter wavelength side.

Figure 8A:
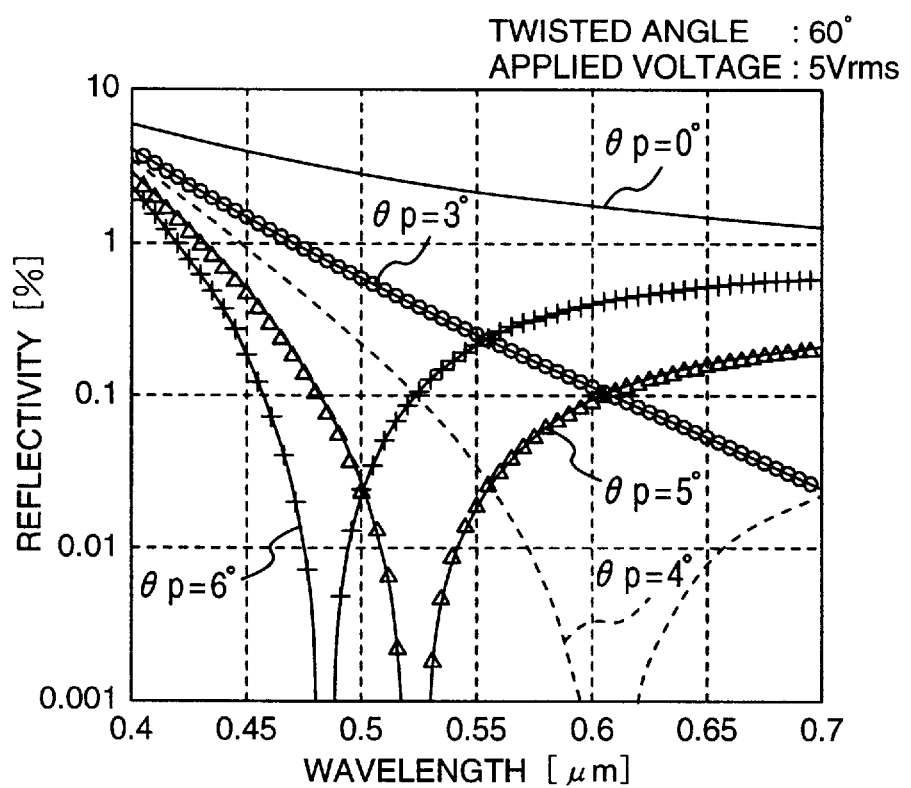
FIG. 8A and FIG. 8B are respectively graphical representations each showing the characteristic curve of the black display when the twisted angle is 60 degrees.
Figure 8B:
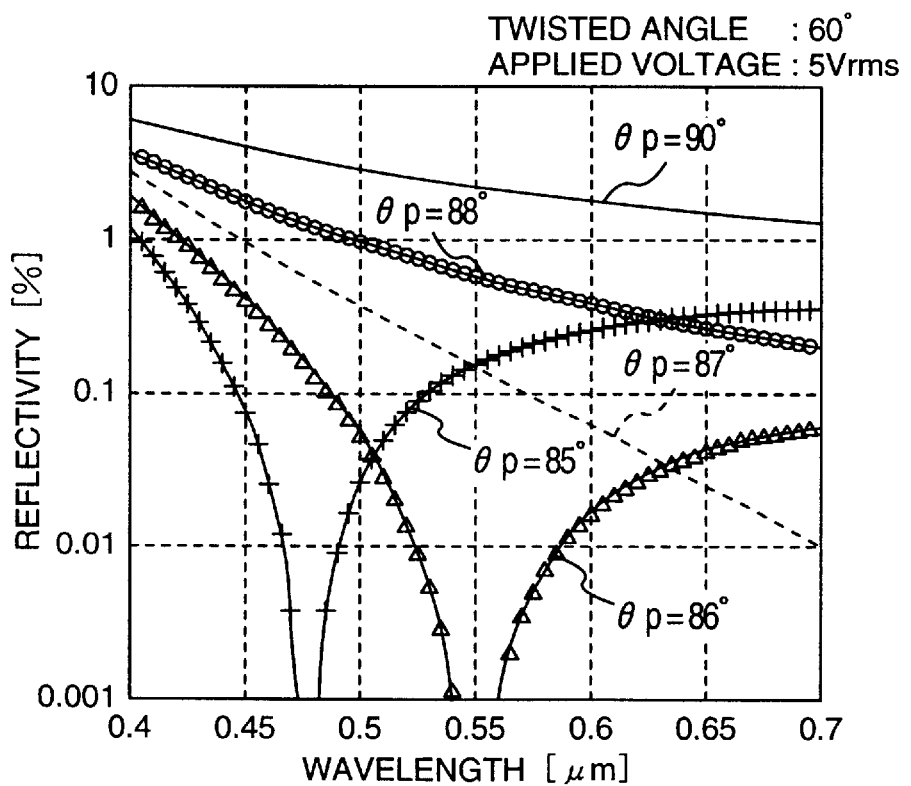

Next, the reflection spectra in the black (dark) display at this time are respectively shown in FIG. 8A and FIG. 8B. Also, the applied voltage is 5 Vrms.

In FIG. 8A, it is understood that the reflectivity is reduced as θp is increased with the reflectivity, when the retardation plate angle θp=0 degree, as the reference. In particular, paying attention to the vicinity of the wavelength 0.55 μm which is the center of the visible region and which is largely connected with the contrast, it is understood that when θp is near 5 degrees, the reflectivity becomes minimum, and when θp is further increased, conversely, the reflectivity is increased. Therefore, it may safely be said that the retardation plate angle 124a (θp) is larger than 0 degree, but is equal to or smaller than 10 degrees or so. In addition, as shown in FIG. 8B, it is understood that the reflectivity is reduced as θp is reduced with the reflectivity, when θp=90 degrees, as the reference. Similarly to the foregoing, paying attention to the vicinity of the wavelength 0.55 μm, it is understood that when θp is near 86 degrees, the reflectivity becomes minimum, and when θp is further reduced, conversely, the reflectivity is increased. Therefore, it may safely be said that the retardation plate angle 124a (θp) is smaller than 90 degrees, but is equal to or larger than 80 degrees or so.

In addition, the description will hereinbelow be given with respect to the case where the twisted angle is 70 degrees with reference to FIG. 9A and FIG. 9B. FIG. 9A and FIG. 9B are respectively graphical representations each showing the reflection spectrum in the while (light) display with respect to the various angles θp of the retardation plate 104 (the retardation plate angle 124a). By the way, the axis of ordinate represents the reflectivity and the axis of abscissa represents the wavelength. Also, the applied voltage is 0 Vrms.

In FIG. 9A, it is understood that the reflectivity is reduced as θp is increased with the reflectivity, when the retardation plate angle θp=0 degree, as the reference. On the other hand, in FIG. 9B, it is understood that as θp is reduced with the reflectivity, when θp=90 degrees, as the reference, the maximum value of the reflectivity is generally fixed, and the peak is shifted to the shorter wavelength side.

Figure 10A:
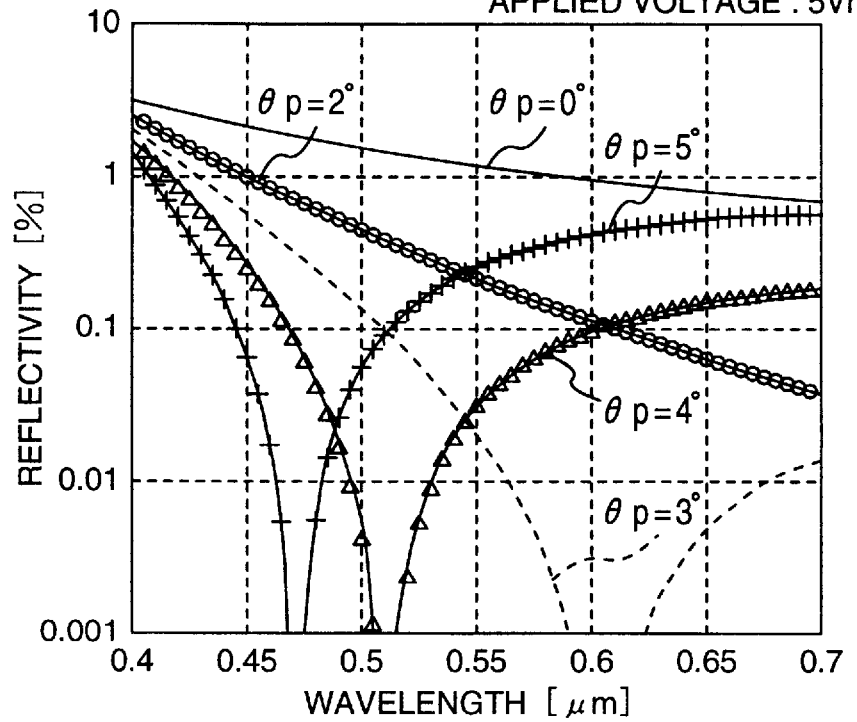
FIG. 10A and FIG. 10B are respectively graphical representations each showing the characteristic curve of the black display when the twisted angle is 70 degrees.
Figure 10B:
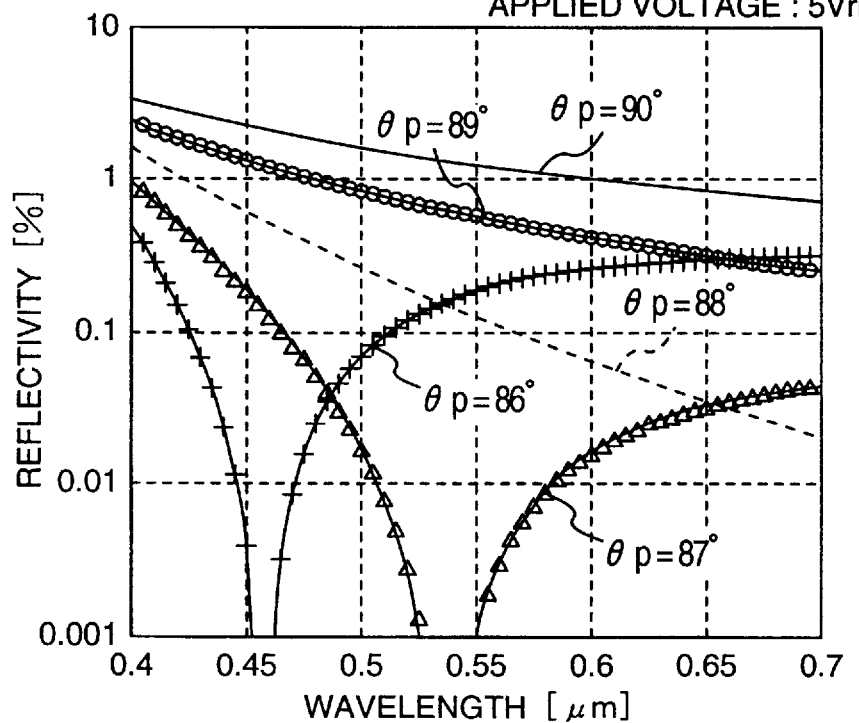

Next, the reflection spectra in the black (dark) display at this time are respectively shown in FIG. 10A and FIG. 10B. Also, the applied voltage is 5 Vrms.

In FIG. 10A, it is understood that the reflectivity is reduced as θp is increased with the reflectivity, when the retardation plate angle θp=0 degree, as the reference. In particular, paying attention to the vicinity of the wavelength 0.55 μm which is the center of the visible region and which is largely connected to the contrast, it is understood that when θp is near the range of 3 to 4 degrees, the reflectivity becomes minimum, and when θp is further increased, conversely, the reflectivity is increased. Therefore, it may safely be said that the retardation plate angle 124a (θp) is larger than 0 degree, but is equal to or smaller than 10 degrees or so. In addition, as shown in FIG. 10B, it is understood that the reflectivity is reduced as θp is reduced with the reflectivity, when θp=90 degrees, as the reference. Similarly to the foregoing, paying attention to the vicinity of the wavelength 0.55 μm, it is understood that when θp is near 87 degrees, the reflectivity becomes minimum, and when θp is further reduced, conversely, the reflectivity is increased. Therefore, it may safely be said that the retardation plate angle 124a (θp) is smaller than 90 degrees, but is equal to or larger than 90 degrees or so.

Figure 11A:
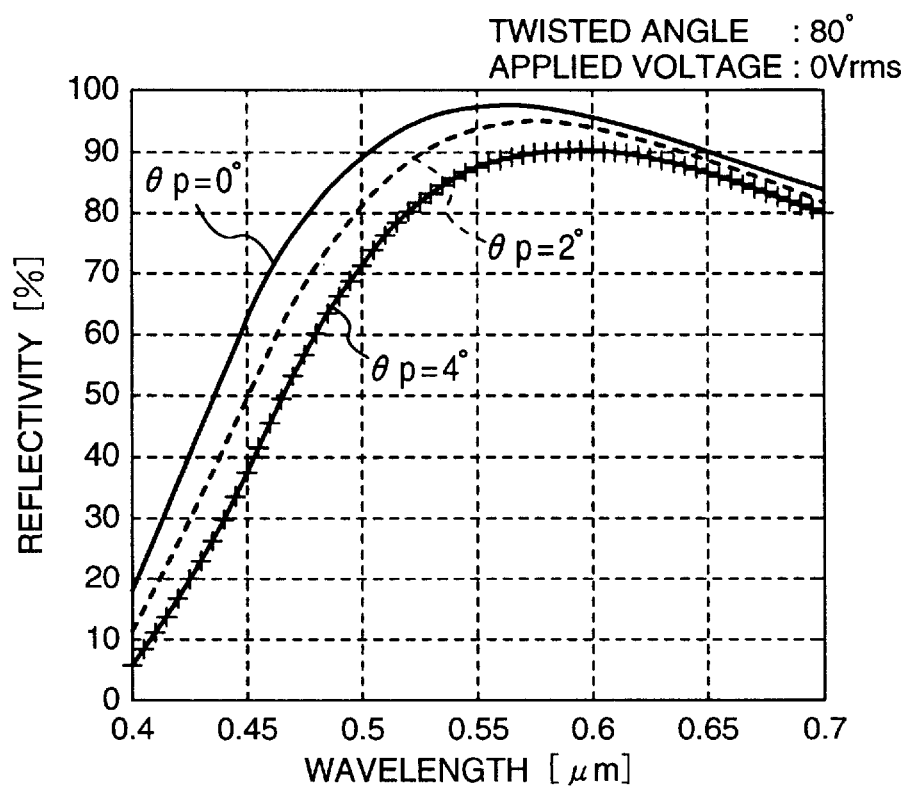
FIG. 11A and FIG. 11B are respectively graphical representations each showing the characteristic curve of the white display when the twisted angle is 80 degrees.
Figure 11B:
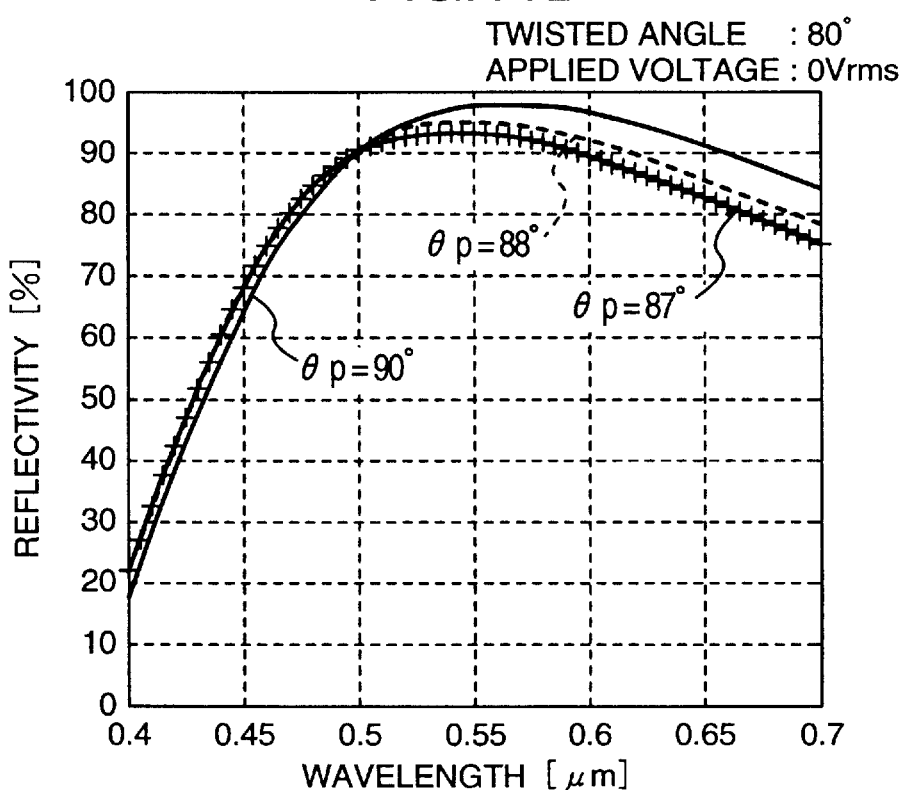

Furthermore, the description will hereinbelow be given with respect to the case where the twisted angle is 80 degrees with reference to FIG. 11A and FIG. 11B. FIG. 11A and FIG. 11B are respectively graphical representations each showing the reflection spectrum in the white (light) display with respect to the various angle θp of the retardation plate 104 (the retardation plate angle 124a). By the way, the axis of ordinate represents the reflectivity and the axis of abscissa represents the wavelength. Also, the applied voltage is 0 Vrms.

In FIG. 11A, it is understood that the reflectivity is reduced as θp is increased with the reflectivity, when the retardation plate angle θp=0 degree, as the reference. On the other hand, in FIG. 11B, it is understood that when θp is reduced with reflectivity, when θp=90 degrees, as the reference, the maximum value of the reflectivity is generally fixed, and the peak is slightly shifted to the shorter wavelength side.

Figure 12A:
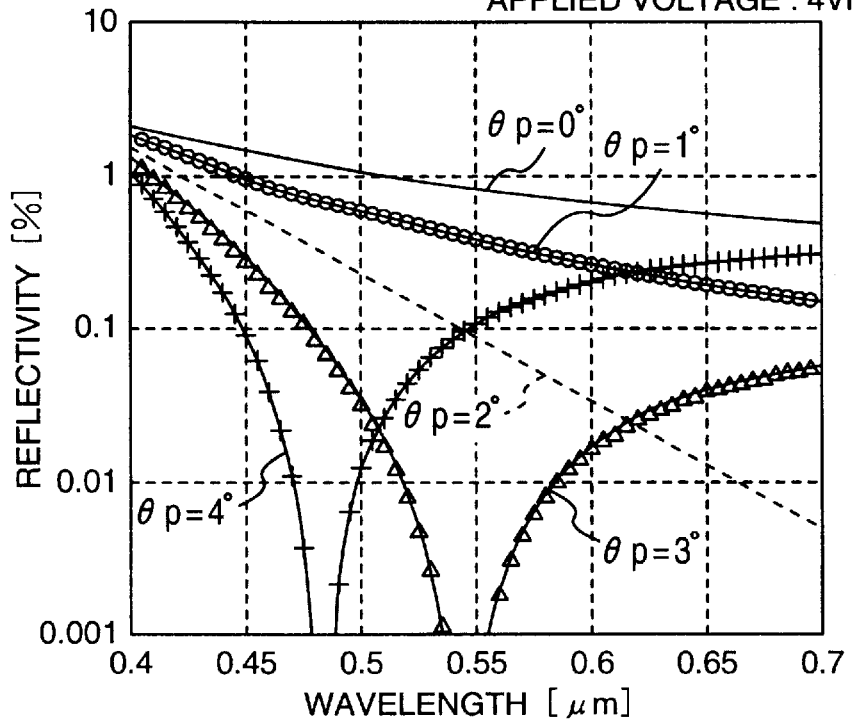
FIG. 12A and FIG. 12B are respectively graphical representations each showing the characteristic curve of the black display when the twisted angle is 80 degrees.
Figure 12B:
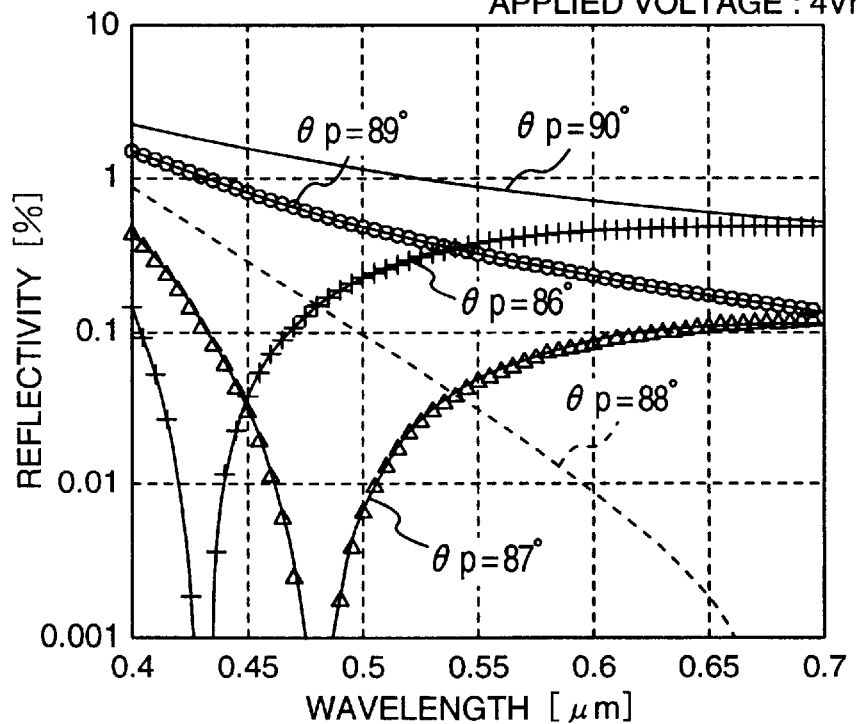

Next, the reflection spectra in the black (dark) display at this time are respectively shown in FIG. 12A and FIG. 12B. Also, the applied voltage is 5 Vrms.

In FIG. 12A, it is understood that the reflectivity is reduced as θp is increased with the reflectivity, when the retardation plate angle θp=0 degree, as the reference. In particular, paying attention to the vicinity of the wavelength 0.55 μm which is the center of the visible region and which is largely connected with the contrast, it is understood that when θp is near 3 degrees, the reflectivity becomes minimum, and when θp is further increased, conversely, the reflectivity is increased. Therefore, it may safely be said that the retardation plate angle 124a (θp) is larger than 0 degree, but is equal to or smaller than 10 degrees or so. In addition, as shown in FIG. 12B, it is understood that the reflectivity is reduced as θp is reduced with the reflectivity, when θp=90 degrees, as the reference. Similarly to the foregoing, paying attention to the vicinity of the wavelength 0.55 μm, it is understood that when θp is near the range of 88 to 87 degrees, the reflectivity becomes minimum, and when θp is further reduced, conversely, the reflectivity is increased. Therefore, it may safely be said that the retardation plate angle 124a (θp) is smaller than 90 degrees, but is equal to or larger than 80 degrees.

Figure 13A:
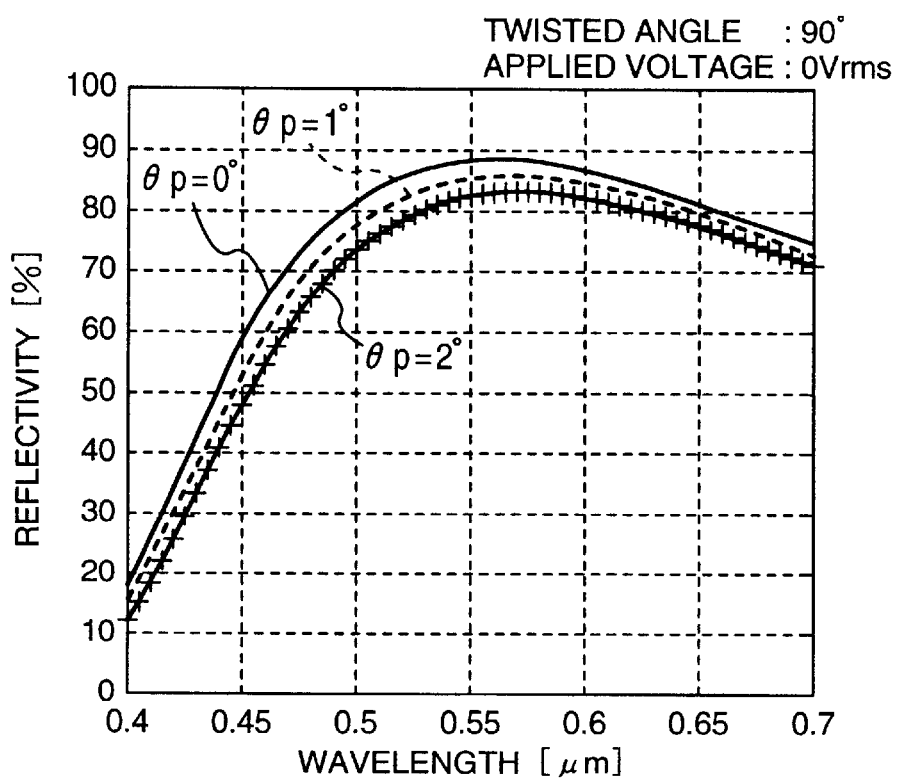
FIG. 13A and FIG. 13B are respectively graphical representations each showing the characteristic curve of the white display when the twisted angle is 90 degrees.
Figure 13B:
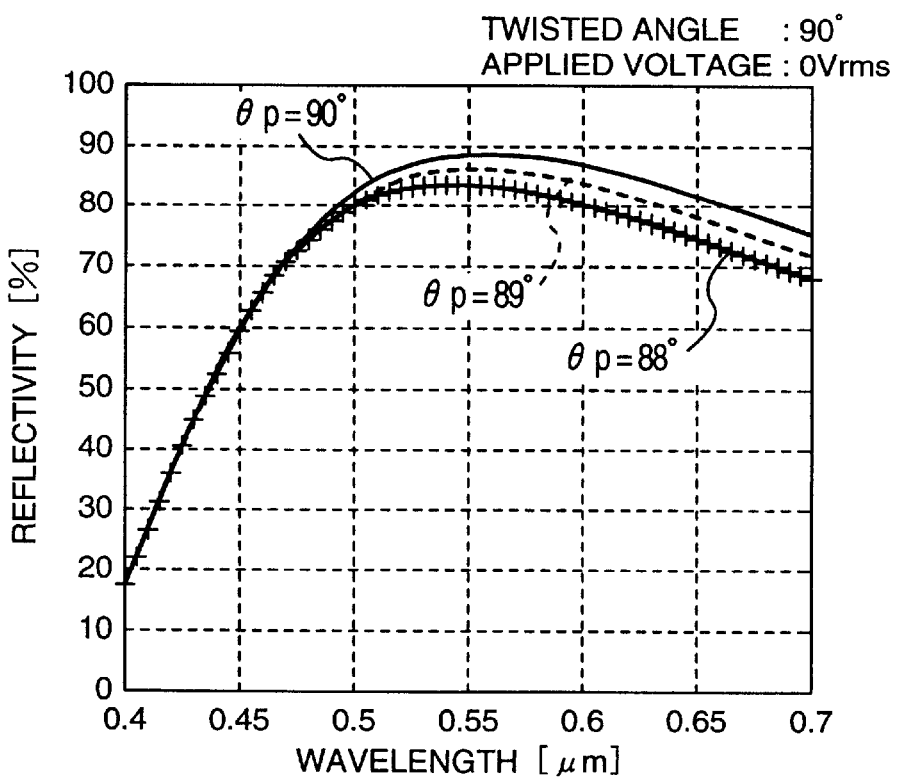

Furthermore, the description will hereinbelow be given with respect to the case where the twisted angle is 90 degrees with reference to FIG. 13A and FIG. 13B. FIG. 13A and FIG. 13B are respectively graphical representations each showing the reflection spectrum in the white (light) display with respect to the various angles θp of the retardation plate 104 (the retardation plate angle 124a). By the way, the axis of ordinate represents the reflectivity and the axis of abscissa represents the wavelength. Also, the applied voltage is 0 Vrms.

In FIG. 13A, it is understood that the reflectivity is reduced as θp is increased with the reflectivity, when the retardation plate angle θp=0 degree, as the reference. On the other hand, in FIG. 13B, it is understood that as θp is reduced with the reflectivity, when θp=90 degrees, as the reference, the maximum value of the reflectivity is generally fixed and the peak is slightly shifted to the shorter wavelength side.

Figure 14A:
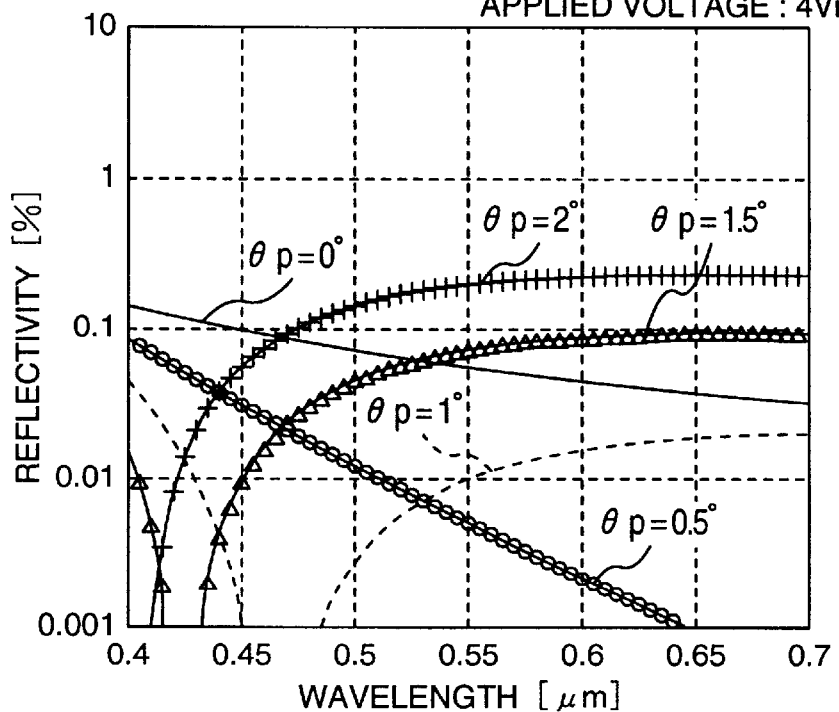
FIG. 14A and FIG. 14B are respectively graphical representations each showing the characteristic Curve of the black display when the twisted angle is 90 degrees.
Figure 14B:
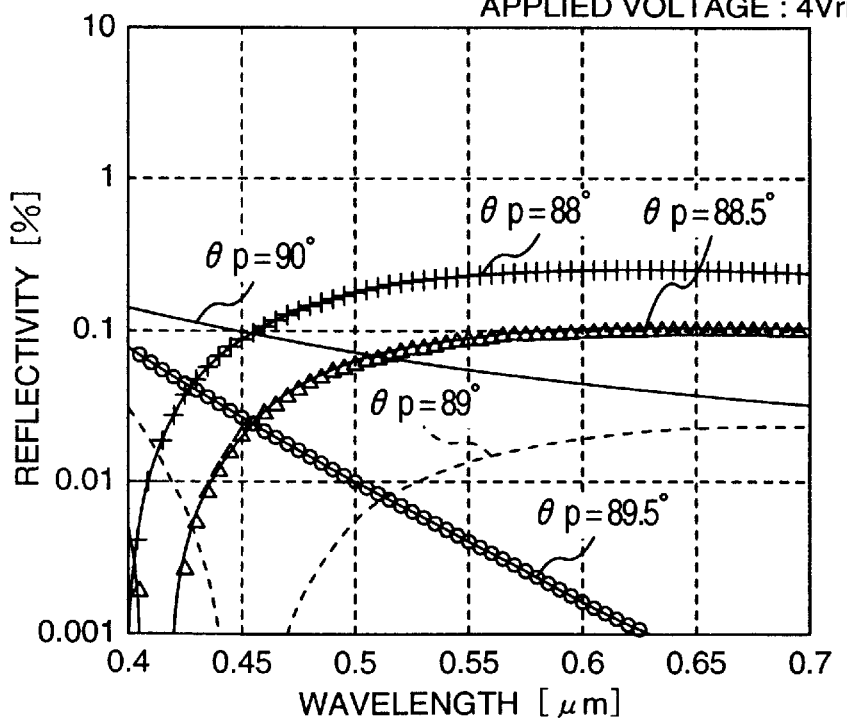

Next, the reflection spectra in the black (dark) display are respectively shown in FIG. 14A and FIG. 14B. Also, the applied voltage is 5 Vrms.

In FIG. 14A, it is understood that the reflectivity is reduced as θp is increased with the reflectivity, when the retardation plate angle θp=0 degrees, as the reference. In particular, paying attention to the vicinity of the wavelength 0.55 μm which is center of the visible region and which is largely connected with the circuit, it is understood that when θp is near the range of 0.5 to 1 degrees, the reflectivity becomes minimum, and when θp is further increased, conversely, the reflectivity is increased. Therefore, it may safely be said that the retardation plate angle 124a (θp) is larger than 0 degree, but is equal to or larger than 10 degrees. In addition, as shown in FIG. 14B, it is understood that the reflectivity is reduced as θp is reduced with the reflectivity, when θp=90 degrees, as the reference. Similarly to the foregoing, paying attention to the vicinity of the wavelength 0.55 μm, it is understood that when θp is near the range of 89.5 to 89 degrees, the reflectivity becomes minimum, and when θp is further reduced, conversely, the reflectivity is increased. Therefore, it may safely be said that the retardation plate angle 124a (θp) is smaller than 90 degrees, but is equal to or larger than 80 degrees or so.

Summing up the foregoing, the large absolute retardation plate angle 124b is required to make the reflectivity in the black (dark) display minimum as the twisted angle is smaller. However, it may safely be said that even if the twisted angle is 50 degrees, the absolute retardation plate angle 124b is in the range of 5 to 6 degrees or so, and hence does not exceed 10 degrees at all.

Therefore, the second embodiment has the feature that the retardation plate angle 124a is larger than 0 degree, but is equal to or smaller than 10 degrees, or equal to or larger than 80 degrees, but is smaller than 90 degrees. In other words, the second embodiment has the feature that the retardation plate angle 124b is larger than 0 degree, but is equal to or smaller than 10 degrees.

In this connection, as can be seen from FIG. 4A and FIG. 4B, it is understood that if the twisted angle is small, then the wavelength standardized retardation required for the display is also small. In other words, when the same liquid crystal material is employed, the thickness of the liquid crystal layer can be made narrow as the twisted angle is smaller, and hence the high speed response can be realized. But, as can be seen if the graphical representations from FIG. 5A and FIG. 5B to FIG. 10A and FIG. 10B are compared with each other, it should be taken into consideration at that when the twisted angle is equal to or smaller than 70 degrees, the reflectivity in the white (light) display when the reflectivity in the black (dark) display is made lowest becomes low as the twisted angle is smaller. In addition, as can be seen if the graphical representations from FIG. 9A and FIG. 9B to FIG. 14A and FIG. 14B are compared with each other, it should also be taken into consideration that when the twisted angle is equal to or larger than 70 degrees, the reflectivity in the white (light) display when the reflectivity in the black (dark) display is made lowest is low as the twisted angle is larger. If the practical reflectivity in the white (light) display is 80%, then it is desirable that the twisted angle is generally in the range of 50 to 90 degrees, and in order to obtain the maximum reflectivity in the white (light) display, it is more desirable that the twisted angle is in the vicinity of 70 degrees. Furthermore, paying attention to the minimum reflectivity in the wavelength 0.55 μm which is the center of the visible region, it is also desirable that θp is in the range of 0.5 to 6 degrees.

Third Embodiment

In a third embodiment, the tilted homeotropic alignment is applied as the liquid crystal layer.

Figure 15:
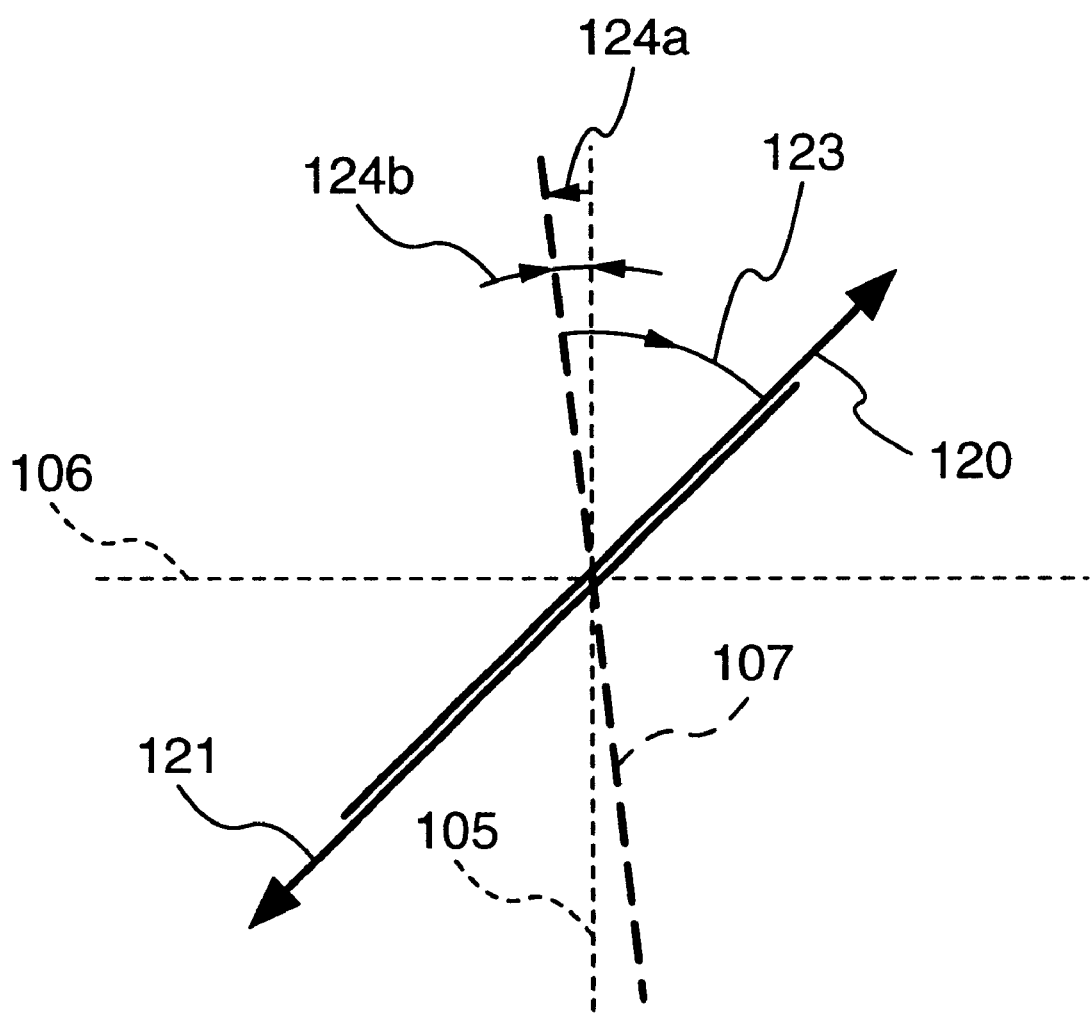
FIG. 15 is a diagram useful in explaining the relationship of the optical axes when the homeotropic alignment is adopted as a liquid crystal layer.

FIG. 15 shows the concrete optical arrangement of the third embodiment. Also, FIG. 15, similarly to FIG. 3, shows the relative relationship of the optical axes when viewed from the vertical direction with respect to the liquid crystal panel. In the third embodiment, the twisted angle is 0 degree, and the alignment angle is generally 45 degrees.

First of all, the description will hereinbelow be given with respect to the problem of the disorder of the liquid crystal alignment due to the lateral electric field in the region between the adjacent pixels.

Figure 16A:
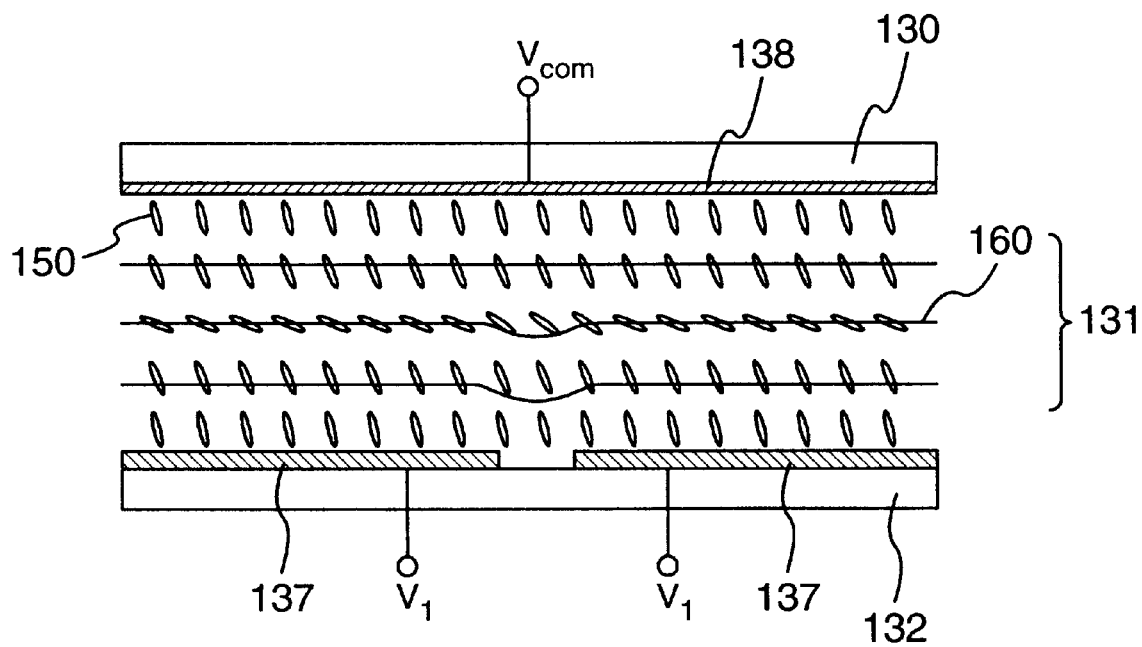
FIG. 16A and FIG. 16B are respectively cross sectional views each useful in explaining the influence of the lateral electric field exerted on the region between the adjacent pixels.
Figure 16B:
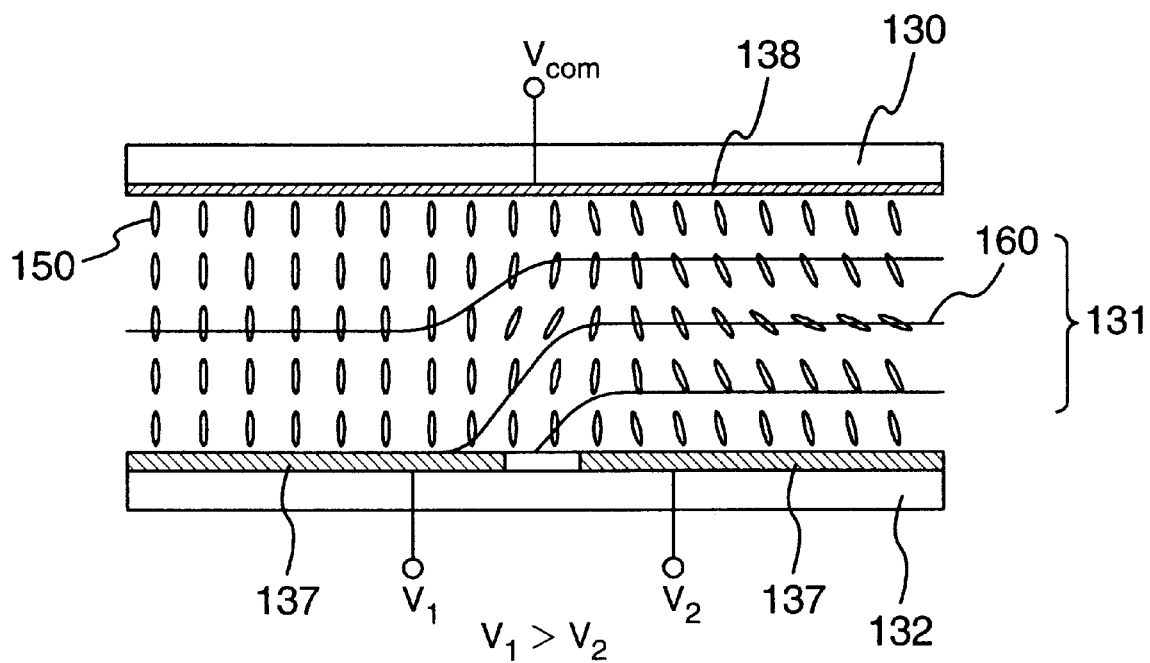

FIG. 16A and FIG. 16B are respectively cross sectional views of the liquid crystal light valve. Then, the transparent electrode 138 is formed on the glass substrate 130 facing the liquid crystal layer of the liquid crystal light valve, and the reflection electrode 137 is formed on the side of the active matrix substrate 132 facing the liquid crystal. In addition, a common voltage Vcom is applied to the transparent electrode 138. In FIG. 16A, there is shown the case where the same voltage (V1) is applied to each of the adjacent reflection electrodes 137 (corresponding to the pixels), while in FIG. 16B, there is shown the case where the different voltages are respectively applied to the adjacent reflection electrodes 137 (V1 is applied to one reflection electrode and V2 is applied to the other reflection electrode (V1>V2)). By the way, in FIG. 16A and FIG. 16B, equipotential lines 160 are shown.

In FIG. 16A, the lateral electric field (the vertical equipotential lines) is hardly generated in the region between the adjacent pixels, whereas in FIG. 16B, the lateral electric field is generated in the region between the adjacent pixels. As a result, in FIG. 16A, the inclination direction of the liquid crystal molecules 150 is generally fixed, whereas in FIG. 16B, there is generated the region in which the inclination direction of the liquid crystal molecules 150 in the region of interest between the adjacent reflection electrodes is inversed as compared with the inclination direction in other regions. In such a region, the response speed of the liquid crystal is very slow, which exerts a bad influence on the display. In order to prevent this problem, it is necessary to control suitably the inclination angle of the liquid crystal molecules on the substrate interface.

Figure 17:
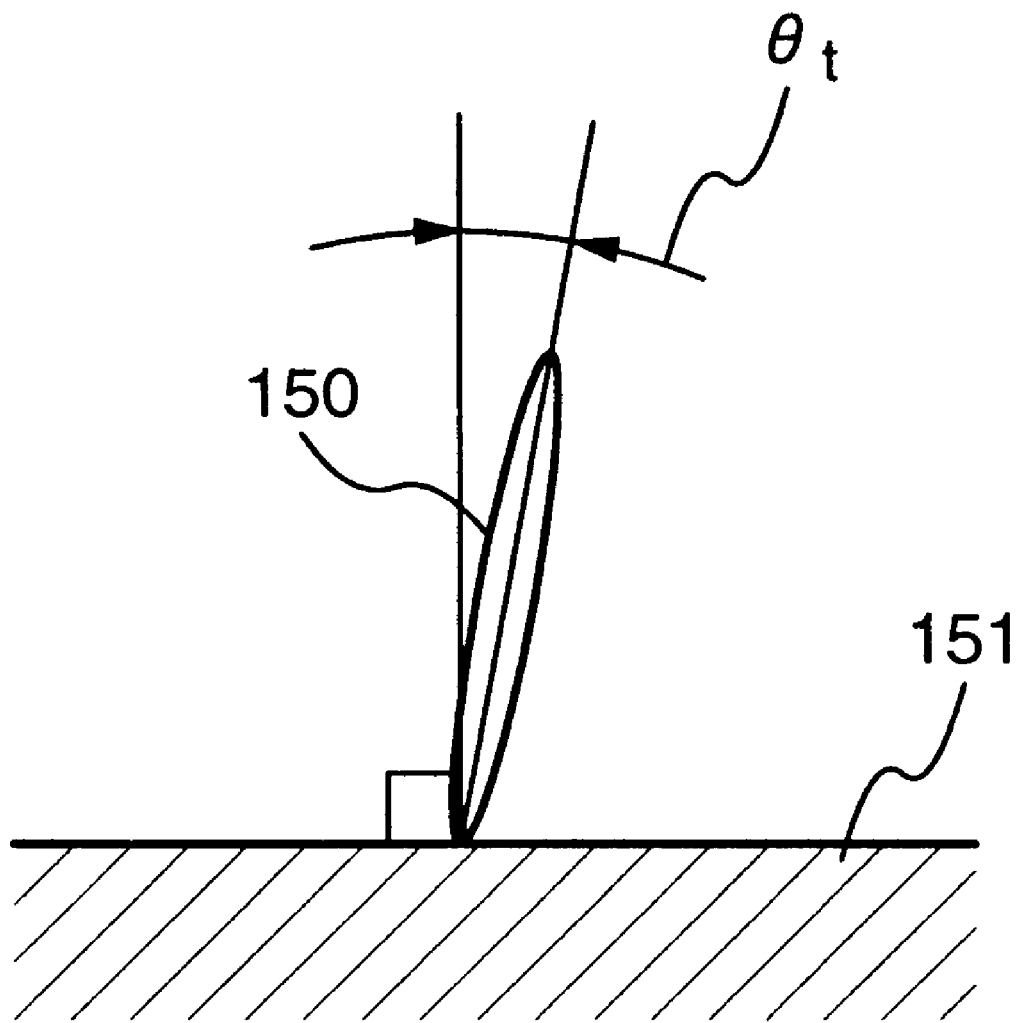
FIG. 17 is a diagram useful in explaining the definition of θt.
Figure 18A:
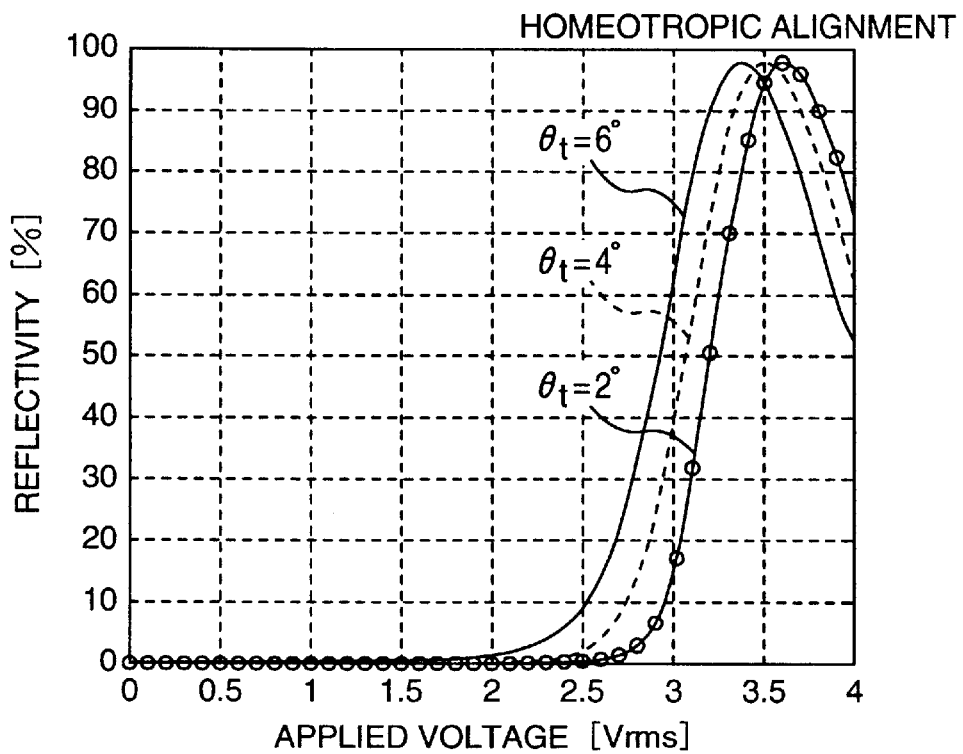
FIG. 18A and FIG. 18B are respectively graphical representations each showing the voltage vs. reflectivity characteristics in the case of the homeotropic alignment.
Figure 18B:
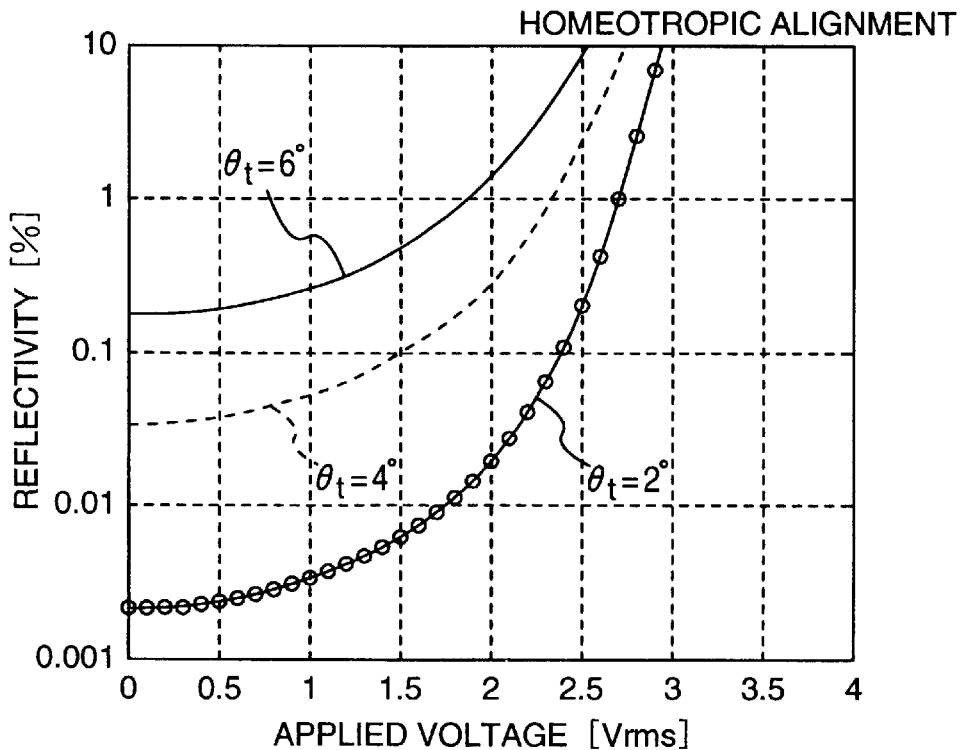

FIG. 17 shows a schematic diagram of the alignment of the liquid crystal molecule 150 on a substrate 151 interface. In this case, the inclination angle of the liquid crystal molecule 150 on the substrate interface, i.e., the angle between the vertical direction of the substrate 151 and the major axis direction of the liquid crystal molecule 150 is defined as θt. In order to prevent the inversion of the inclination direction of the liquid crystal molecules, i.e., to ensure the resistance to the lateral electric field, it is desirable that θt is in the range of 4 to 6 degrees. However, there arises the problem that when θt is increased, the reflectivity in the black (dark) display is increased to reduce the contrast ratio. That is, the resistance to the lateral electric field generated in the region between the adjacent reflection electrodes and the contrast ratio show the trade-off relationship. FIG. 18A and FIG. 18B show the applied voltage vs. reflectivity characteristics when θt is set to 2 degrees, 4 degrees and 6 degrees, respectively. Also, FIG. 18A is a linear plot of the data, and FIG. 18B is a logarithmic plot of the data plotted in FIG. 18A. In these figures, even when θt is increased, the reflectivity in the white (light) display (in the vicinity of about 3.5 V) is generally fixed, whereas the reflectivity in the black (dark) display (in the vicinity of about 0 V) has a tendency to be increased. Since the contrast ratio is obtained by dividing the reflectivity in the white (light) display by the reflectivity in the black (dark) display, the situation in which when θt is increased, the contrast ratio is reduced is understood from FIG. 18A and FIG. 18B.

Figure 19A:
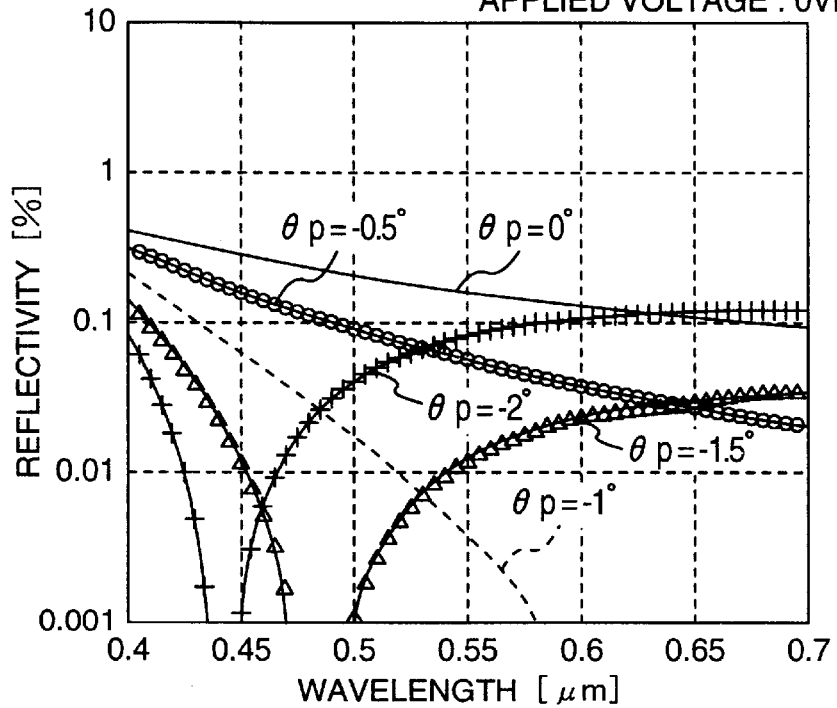
FIG. 19A and FIG. 19B are respectively graphical representations each showing the characteristic curve in the black display in the case of the homeotropic alignment.
Figure 19B:
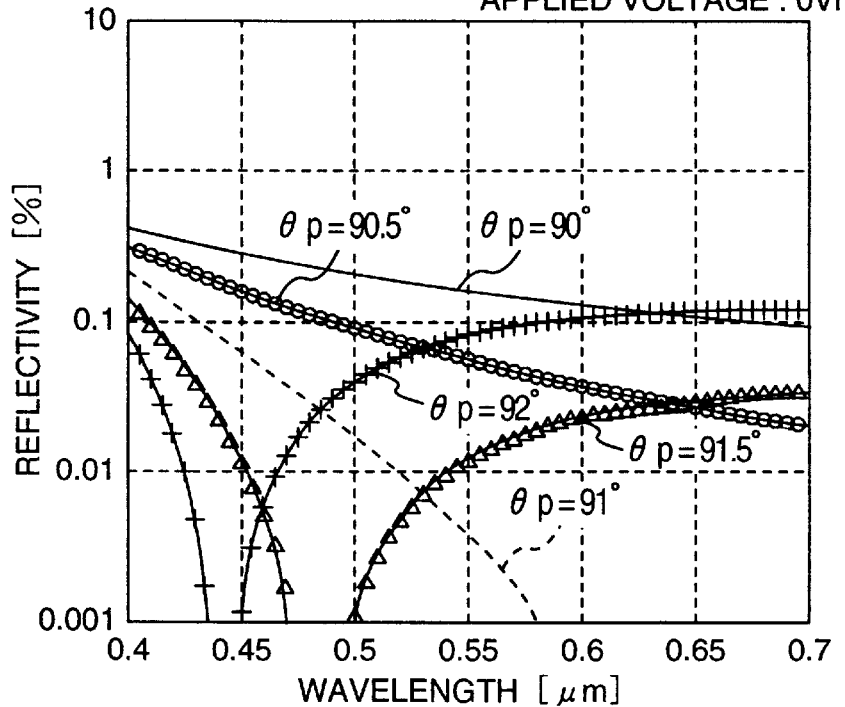

FIG. 19A and FIG. 19B are respectively graphical representations each showing the reflection spectrum in the black (dark) display against the angle of the retardation plate 104. Also, FIG. 19A shows the reflection spectrum when θp is near 0 degree, and FIG. 19B shows the reflection spectrum when θp is near 90 degrees.

FIG. 19A shows the situation in which the reflectivity is reduced as the retardation plate angle 124b, i.e., θp is decreased from 0 degree. In particular, paying attention to the vicinity of the wavelength 0.55 μm which is the center of the visible range and which is largely connected with the contrast, it is understood that when θp is in the range of −1 to −1.5 degrees, the reflectivity becomes minimum and when θp is further reduced, conversely, the reflectivity is increased. Therefore, it may safely be said that the retardation plate angle 124a needs to be smaller than 0 degree, but to be equal to or larger than −10 degrees. In addition, as shown in FIG. 19B, the situation is understood in which the reflectivity is reduced as θp is increased as compared with the case of θp=90 degrees. In this case as well, paying attention to the vicinity of the wavelength 0.55 μm, it is understood that when θp is in the range of 91 to 91.5 degrees, the reflectivity becomes minimum, and when θp is further increased, conversely, the reflectivity is increased. Therefore, it may safely be said that the retardation plate angle 124a needs to be larger than 90 degrees, but to be equal to or smaller than 100 degrees. In other words, the feature of the third embodiment is that the absolute retardation plate angle 124b is larger than at least 0 degree, but is equal to or smaller than 10 degrees.

Figure 20A:
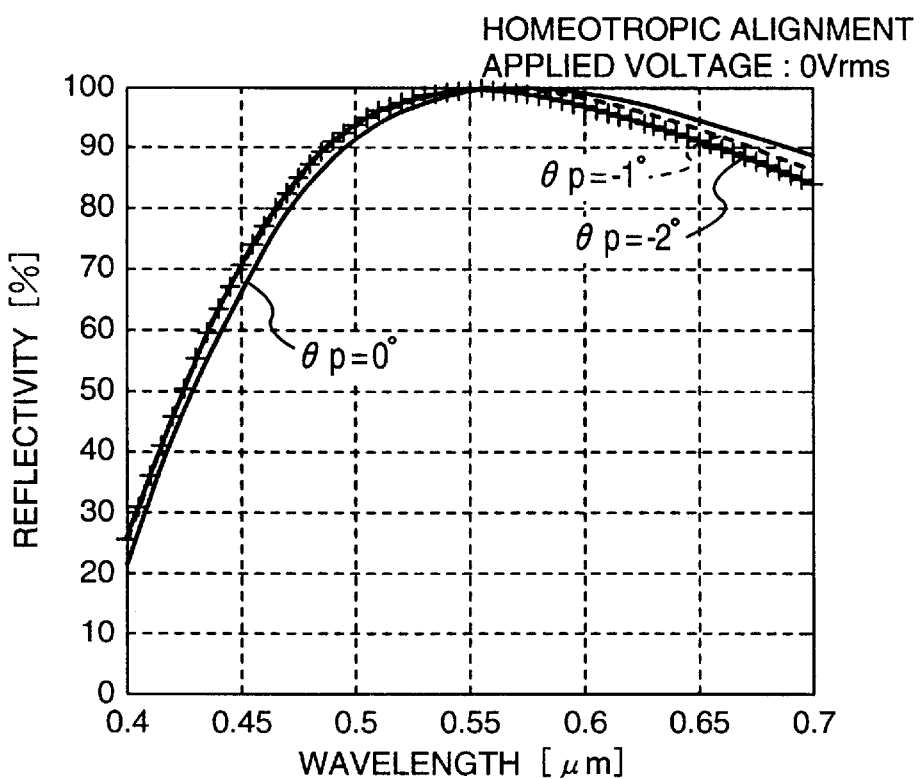
FIG. 20A and FIG. 20B are respectively graphical representations each showing the characteristic curve in the white display in the case of the homeotropic alignment.
Figure 20B:
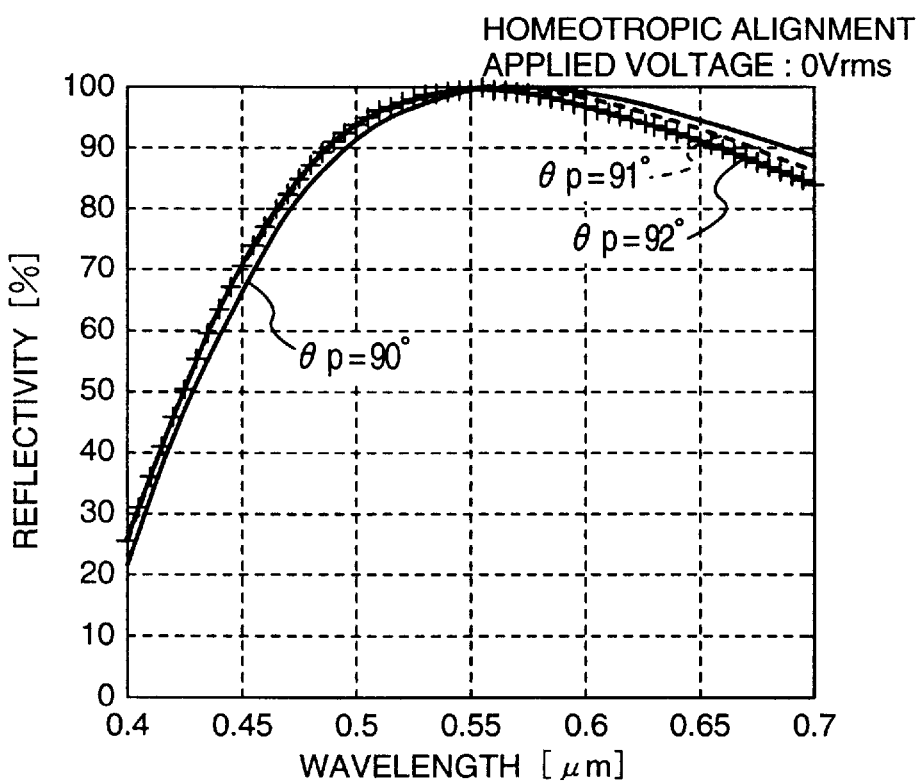

FIG. 20A and FIG. 20B are respectively graphical representations each showing the reflection spectrum in the white (light) display against the angle of the retardation plate 104. In FIG. 20A and FIG. 20B, it is understood that even when θp as the retardation plate angle 124a is set to the range of 0 to −2 degrees, or to the range of 90 to 92 degrees, the reflection spectrum is not largely changed, and hence this change falls in the tolerance in the contrast ratio.

Therefore, θp as the retardation plate angle 124a is set to the range of −1 to −1.5 degrees, or to the range of 91 to 91.5 degrees, whereby the contrast ratio is greatly enhanced. In other words, the absolute retardation plate angle 124b is set to the range of 1 to 1.5 degrees, whereby the contrast ratio is greatly enhanced.

Fourth Embodiment

Figure 21:
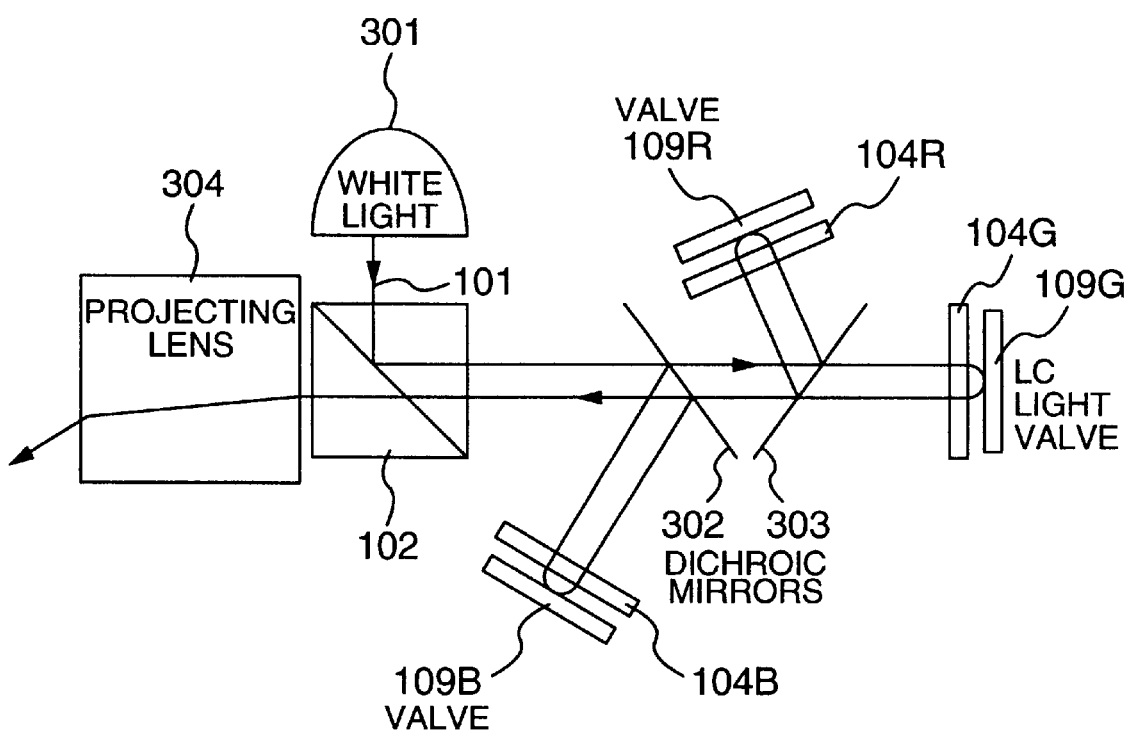
FIG. 21 is a schematic diagram showing an embodiment of a liquid crystal projector to which the present invention is applied.

The description will hereinbelow be given with respect to an embodiment of a liquid crystal projector employing the liquid crystal light valve of the first embodiment with reference to FIG. 21. The liquid crystal projector of the fourth embodiment includes a white light source 301, a polarizing beam splitter 102, dichroic mirrors 302 and 303, the liquid crystal light valves 109R, 109G and 109B of the first embodiment, retardation plates 104R, 104G and 104B, a projecting lens 304 and the like.

The light emitted from the white light source 301 is firstly made incident to the polarizing beam splitter 102. Then, only the light of the polarized light component which is vertical with respect to the drawing is reflected from the polarizing beam splitter 102. After the reflected light has been separated into the primary color lights of Red, Blue and Green in the dichroic mirrors 302 and 303, they are made incident to the liquid crystal light valves 109R, 109G and 109B, respectively. The primary color lights which have been made incident to the respective liquid crystal light valves are subjected to the phase modulation through the respective liquid crystal layers to be reflected by the respective pixel electrodes to be color-composed again by the dichroic mirrors 302 and 303. Thereafter, only the polarized light component which is parallel to the drawing is transmitted through the polarizing beam splitter 102 to be projected on a screen (not shown in FIG. 21) through the projecting lens 304.

Since in the present embodiment, the liquid crystal display element of the first embodiment is employed, it is possible to realize the liquid crystal projector in which the contrast ratio is high and also the response time of the liquid crystal is short, more specifically, the liquid crystal projector which is capable of carrying out smoothly the moving image display.

In this connection, it is to be understood that the retardation plate angle 124a of each of the retardation plates 104R, 104G and 104B for each of the primary colors is desirably optimized every primary color. In addition there to, as can be seen from FIG. 5A and FIG. 5B to FIG. 14A and FIG. 14B, it is desirable that the absolute retardation plate angle 124b of the retardation plate 104, in any of the primary colors, is larger than 0 degree, but is equal to or smaller than 10 degrees at most.

While in the fourth embodiment, the dichroic mirrors 302 and 303 are arranged between the polarizing beam splitter 102 and the retardation plate 104, alternatively, instead of the dichroic mirrors 302 and 303, the prism(s) may also be employed because it is the substance of the invention to shift the retardation plate angle as the angle of the optical axis of the retardation plate arranged between the polarizing beam splitter as the polarizing element and the liquid crystal valve from the polarizing axis of the polarizing beam splitter to arrange them in such a manner.

In addition, while from the same reason, in the fourth embodiment, the dichroic mirrors 302 and 303 are arranged between the polarizing beam splitter 102 and the retardation plate 104, alternately, there may adopted the construction in which after the light 101 emitted from the white light source 301 has previously been separated into the primary color lights through the dichroic mirror(s) or the like, the resultant primary color lights are made incident to the polarizing beam splitters. In this case, it is necessary to arrange the polarizing beam splitter every primary color.

In addition thereto, from the same reason, the present invention is effective in the optical system as well in which the color polarizing filter as described in an article of SID 2000 Digest, p. 92 and the polarizing beam splitter are combined with each other.

Furthermore, while in the fourth embodiment, the liquid crystal light valve described in the first embodiment is employed, it is of cause to be understood that it is possible to employ the liquid crystal light valves which were described in the second embodiment and the third embodiment, respectively.

While the present invention has been particularly shown and described with reference to the embodiments and the specified modifications thereof, it will be understood that the various changes and other modifications will occur to those skilled in the art without departing from the scope and spirit of the invention. The scope of the invention is therefore to be determined solely by the appended claims.

What is claimed is:

1. A liquid crystal display device including:

a liquid crystal display element having: a liquid crystal light valve having one pair of substrates, a transparent electrode formed on one of said one pair of substrates, a reflection electrode formed on the other of said one pair of electrodes, and a liquid crystal layer held between said one pair of substrates; and a retardation plate;

a light source for supplying light to be made incident to said liquid crystal display element; and a polarizing optical element arranged between said liquid crystal display element and said light source;

wherein an optical axis of said retardation plate constituting a fast axis or a slow axis and a polarizing direction of polarized light made incident to said retardation plate are shifted from each other in order to arrange these optical elements;

wherein said liquid crystal layer in said liquid crystal display element is the liquid crystal layer having the homeotropic alignment; and wherein an angle between a first liquid crystal alignment direction in said liquid crystal display element and a polarizing axis of said polarizing optical element is 45 degrees, and an angle between the optical axis of said retardation plate and said polarizing axis of said polarizing optical element is smaller than 0 degree, but is equal to or larger than −10 degrees.

2. A liquid crystal display device including:

a liquid crystal display element having: a liquid crystal light valve having one pair of substrates, a transparent electrode formed on one of said one pair of substrates, a reflection electrode formed on the other of said one pair of electrodes, and a liquid crystal layer held between said one pair of substrates; and a retardation plate;

a light source for supplying light to be made incident to said liquid crystal display element; and a polarizing optical element arranged between said liquid crystal display element and said light source, wherein an optical axis of said retardation plate constituting a fast axis or a slow axis and a polarizing direction of polarized light made incident to said retardation plate are shifted from each other in order to arrange these optical elements;

wherein said liquid crystal layer in said liquid crystal display element is the liquid crystal layer having the homeotropic alignment; and wherein an angle between a first liquid crystal alignment direction in said liquid crystal display element and a polarizing axis of said polarizing optical element is 45 degrees, and the absolute value of an angle between the optical axis of said retardation plate and a polarizing axis of said polarizing optical element is larger than 90 degrees, but is equal to or smaller than 100 degrees.

3. A liquid crystal display device according to claim 1, wherein the retardation of said retardation plate in said liquid crystal display element is in the range of 100 to 175 nm.

4. A computer screen comprising the liquid crystal display device according to claim 1.

5. A projector comprising the liquid crystal display device according to claim 1.

6. A liquid crystal display device according to claim 2, wherein the retardation of said retardation plate in said liquid crystal display element is in the range of 100 to 175 nm.

7. A computer screen comprising the liquid crystal display device according to claim 2.

8. A projector comprising the liquid crystal display device according to claim 2.

* * * * *